(12) United States Patent
Lira

(10) Patent No.: US 7,487,444 B2
(45) Date of Patent: Feb. 3, 2009

(54) REFORMATTING COLUMNS OF CONTENT FOR DISPLAY

(75) Inventor: Luigi Lira, Costa Mesa, CA (US)

(73) Assignee: AOL LLC, Dulles, VA (US)

( * ) Notice: Subject to any disclaimer, the term of this patent is extended or adjusted under 35 U.S.C. 154(b) by 379 days.

(21) Appl. No.: 10/307,417

(22) Filed: Dec. 2, 2002

(65) Prior Publication Data

US 2003/0182628 A1 Sep. 25, 2003

Related U.S. Application Data

(60) Provisional application No. 60/368,988, filed on Apr. 2, 2002, provisional application No. 60/365,197, filed on Mar. 19, 2002, provisional application No. 60/365,161, filed on Mar. 19, 2002, provisional application No. 60/365,160, filed on Mar. 19, 2002.

(51) Int. Cl.
*G06F 17/00* (2006.01)

(52) U.S. Cl. .................. 715/247; 715/227; 715/252

(58) Field of Classification Search .......... 715/517, 715/518, 509, 520, 523, 513, 700, 788, 784, 715/786, 787, 234, 227, 228, 243–247, 252, 715/255; 707/102
See application file for complete search history.

(56) References Cited

U.S. PATENT DOCUMENTS

| | | | |
|---|---|---|---|
| 5,038,138 A | 8/1991 | Akiyama et al. | |
| 5,260,697 A | 11/1993 | Barrett et al. | 715/513 |
| 5,317,306 A * | 5/1994 | Abraham et al. | 345/684 |
| 5,365,461 A | 11/1994 | Stein et al. | 700/298 |
| 5,463,725 A | 10/1995 | Henckel et al. | |
| 5,657,434 A | 8/1997 | Yamamoto et al. | 345/684 |
| 5,740,389 A | 4/1998 | Li et al. | |
| 5,844,561 A | 12/1998 | Tanimoto et al. | |
| 5,845,303 A * | 12/1998 | Templeman | 715/517 |
| 6,023,714 A * | 2/2000 | Hill et al. | 715/513 |
| 6,037,937 A | 3/2000 | Beaton et al. | |
| 6,161,114 A * | 12/2000 | King et al. | 715/517 |
| 6,211,877 B1 | 4/2001 | Steele et al. | |
| 6,212,577 B1 | 4/2001 | Stern et al. | 719/239 |
| 6,259,449 B1 | 7/2001 | Saxena et al. | |
| 6,326,970 B1 * | 12/2001 | Mott et al. | 345/667 |
| 6,337,697 B1 | 1/2002 | Kim | 715/784 |
| 6,340,979 B1 | 1/2002 | Beaton et al. | |
| 6,374,273 B1 * | 4/2002 | Webster | 715/513 |
| 6,389,437 B2 * | 5/2002 | Stoub | 715/523 |
| 6,396,487 B1 | 5/2002 | Jameson | 715/788 |
| 6,456,305 B1 | 9/2002 | Qureshi et al. | |

(Continued)

OTHER PUBLICATIONS

Webopedia Definition, "WML", Nov. 9, 2001, pp. 1, http://www.webopedia.com/TERM/W/WML.html.*

(Continued)

*Primary Examiner*—Adam L Basehoar
(74) *Attorney, Agent, or Firm*—Fish & Richardson P.C.

(57) ABSTRACT

Viewing an electronic document in a display window of a display includes detecting a layout of the electronic document and comparing the layout of the electronic document to a width of the display window. The electronic document is reformatted into at least two columns, with each of the columns having a width that does not exceed a width of the display window.

63 Claims, 25 Drawing Sheets

U.S. PATENT DOCUMENTS

| | | | |
|---|---|---|---|
| 6,456,307 B1 | 9/2002 | Bates et al. | |
| 6,457,030 B1 * | 9/2002 | Adams et al. | 715/523 |
| 6,526,399 B1 | 2/2003 | Coulson et al. | 707/1 |
| 6,593,944 B1 * | 7/2003 | Nicolas et al. | 715/744 |
| 6,597,378 B1 | 7/2003 | Shiraishi et al. | 715/764 |
| 6,707,449 B2 | 3/2004 | Hinckley et al. | |
| 6,724,618 B1 | 4/2004 | Jenkins et al. | 361/684 |
| 6,727,894 B1 | 4/2004 | Karidis et al. | 345/174 |
| 6,857,102 B1 * | 2/2005 | Bickmore et al. | 715/501.1 |
| 6,883,000 B1 | 4/2005 | Gropper | 707/10 |
| 6,976,226 B1 * | 12/2005 | Strong et al. | 715/788 |
| 2001/0043238 A1 | 11/2001 | Guerrero | |
| 2001/0047394 A1 | 11/2001 | Kloba et al. | |
| 2001/0051943 A1 | 12/2001 | Drucker et al. | |
| 2002/0069296 A1 * | 6/2002 | Aua et al. | 709/246 |
| 2003/0005302 A1 | 1/2003 | Searle | |
| 2003/0014445 A1 * | 1/2003 | Formanek et al. | 707/526 |
| 2003/0110485 A1 * | 6/2003 | Lu et al. | 725/9 |
| 2003/0160814 A1 | 8/2003 | Brown | |
| 2004/0049737 A1 * | 3/2004 | Simon Hunt et al. | 715/513 |
| 2004/0107403 A1 * | 6/2004 | Tetzchner | 715/513 |
| 2005/0080682 A1 * | 4/2005 | Wilson | 705/26 |
| 2005/0273723 A1 | 12/2005 | Sharpe | |
| 2008/0077880 A1 * | 3/2008 | Oygard | 715/799 |

OTHER PUBLICATIONS

FOLDOC Definition, "Internet", Feb. 21, 2000, pp. 1, http://wombat.doc.ic.ac.uk/foldoc/foldoc.cgi?query=Internet.*

Webopedia Definition, "WAP", Apr. 7, 2001, pp. 1-3, http://web.archive.org/web/20010407102338/http://webopedia.com/TERM/W/WAP.html.*

Trapani et al., U.S. Appl. No. 60/199,858, filed Apr. 26, 2000, entitled "Method and Apparatus for Appliance Communication," 30 pages.

Polonsky et al., U.S. Appl. No. 09/842,474, filed Apr. 25, 2001, entitled "System and Method for Accessing Information Content," 76 pages (clean version).

Polonsky et al., U.S. Appl. No. 09/842,474, filed Apr. 25, 2001, entitled "System and Method for Accessing Information Content," 77 pages (marked up version).

Trapani et al., U.S. Appl. No. 09/843,036, filed Apr. 25, 2001, entitled "System And Method For Adapting Information Content For An Electronic Device," 75 pages.

* cited by examiner

REFORMATTING COLUMNS OF CONTENT FOR DISPLAY

CROSS-REFERENCE TO RELATED APPLICATIONS

This application claims priority to U.S. application Ser. No. 60/365,197, filed on Mar. 19, 2002 and entitled "Displaying Content on a Display in Column Format," U.S. application Ser. No. 60/365,161, filed on Mar. 19, 2002 and entitled "Control and Correction of Display Navigation," U.S. application Ser. No. 60/365,160, filed on Mar. 19, 2002 and entitled "Limited Display Device Page Scrolling," and U.S. application Ser. No. 60/368,988, filed on Apr. 2, 2002 and entitled "Animated Display," all of which are herein incorporated by reference.

TECHNICAL FIELD

The following description relates generally to a viewing and navigation aid for displaying information on an electronic device having limited display capability.

BACKGROUND

Web pages and other electronic documents generally are formatted for viewing and navigation in display windows of standard-sized or oversized displays, such as, for example, in a display window on a monitor for a desktop computer. The user of the computer can view the entire Web page on one screen display or can easily scroll a short distance to view other portions of the Web page. However, when content is displayed on an electronic device having a display window with smaller dimensions, such as, for example, the display window of a personal digital assistant ("PDA") only a small portion of the Web page is displayed. This may render the document may be difficult to read.

SUMMARY

A document served to a device having a small display or a small display window, such as, for example, a PDA, a telephone, a handheld computer, or an electronic book, can be reformatted such that the width of the document is divided into columns, with each column being displayable across the entirety of the small display or display window. In this manner, the width of the small display or display window is used to display less than all of the width of the document. The columns may be defined based on the content within the document, as long as the column width does not exceed the width of the small display or display window. For instance, when the content corresponds to a hypertext markup language ("HTML") page, several natural or logical columns that are recognizable within the HTML page may be used to define the columns being served to the small display or display window, even if those columns don't have a uniform width.

In one general aspect, viewing an electronic document in a display window of a display includes detecting a layout of an electronic document and comparing the layout of the electronic document to a width of the display window. The electronic document then is reformatted into at least two columns, with each of the columns having a width that does not exceed the width of the display window.

Implementations may include one or more of the following features. For example, detecting the layout of the electronic document may include detecting logical columns of the electronic document, and reformatting the electronic document may include reformatting each logical column to have a width that does not exceed the width of the display window. Detecting the layout of the electronic document also may include identifying a format code of the electronic document, such as a HTML format code (e.g., a header tag, a body tag, or a table tag).

Reformatting the electronic document into at least two columns may further include aligning the columns for viewing in the display window.

The display may be part of a client of a client/host architecture, and comparing the layout may further include notifying a host of the display window size from information residing at the client. A connection may be established between the client and the host. Notifying the host may include notifying the host once upon establishment of a connection between the client and the host. The host may be updated with information residing at the client at time intervals after establishing the connection between the client and the host. Reformatting the electronic document may further include requesting that the host reformat the electronic document in response to a command executed by the client.

The electronic document may be coded in hypertext markup language ("HTML"). Reformatting the electronic document may include recoding the electronic document in a language other than HTML.

The columns may be displayed on the display of an electronic device. The electronic device may be connected to the Internet, and may be, for example, a personal digital assistant, a mobile phone, an Internet-enabled television set-top box, or a computer of a small physical size for portability relative to a desktop computer and having a display size smaller than that of a desktop computer.

Implementations of the techniques described may include a method or process, an apparatus or system, or computer software on a computer-accessible medium. The techniques may be used in conjunction with devices such as, for example, PDAs, telephones, including wireless and web phones, handheld computers, monitors, games, and electronic books. The details of one or more implementations are set forth in the accompanying drawings and the description below. Other features will be apparent from the description, the drawings, and the claims.

DESCRIPTION OF DRAWINGS

FIGS. 4A and 4B illustrates reformatting of a page.

Like reference symbols in the various drawings indicate like elements.

DETAILED DESCRIPTION

Pages coded according to hypertext markup language ("HTML") are designed for display in display windows of different sizes. On smaller displays, a width of a display window often corresponds to a width of a display minus a width of a window frame and a width of a vertical scroll bar, and may be constrained to be no larger. On larger displays, the width of a display window may constitute a smaller portion of the entire width of the display. In some cases, a display window may constitute the entirety of the display (i.e., there may be no window frame or scroll bar). In other cases, the display window may be purposefully sized to be substantially smaller than the overall size of the display. For example, a user of a desktop system with a large display may open a small display window to view a particular page.

Figure 1A:
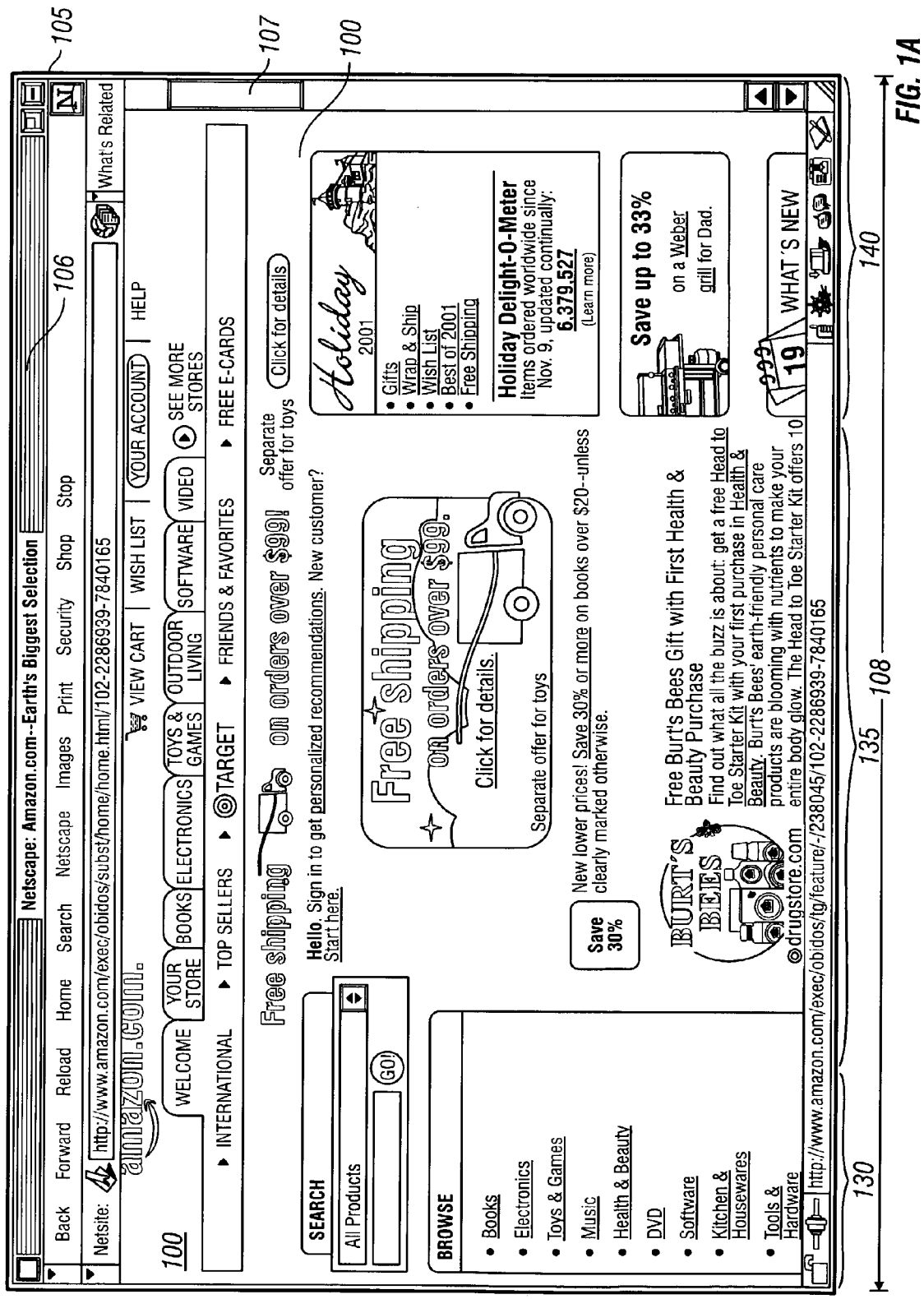
FIGS. 1A-1D are screen shots of a page on display windows of varying dimensions.

Typically, a page expands or shrinks to match the width of the display window. FIG. 1A illustrates a page 100 in a wide display window 105 having a window frame 106 and a scroll bar 107. The display window 105 may be, for example, the window that would be displayed on the monitor of a desktop computer. As shown, the page 100 expands to fit the window width 108.

Figure 1B:
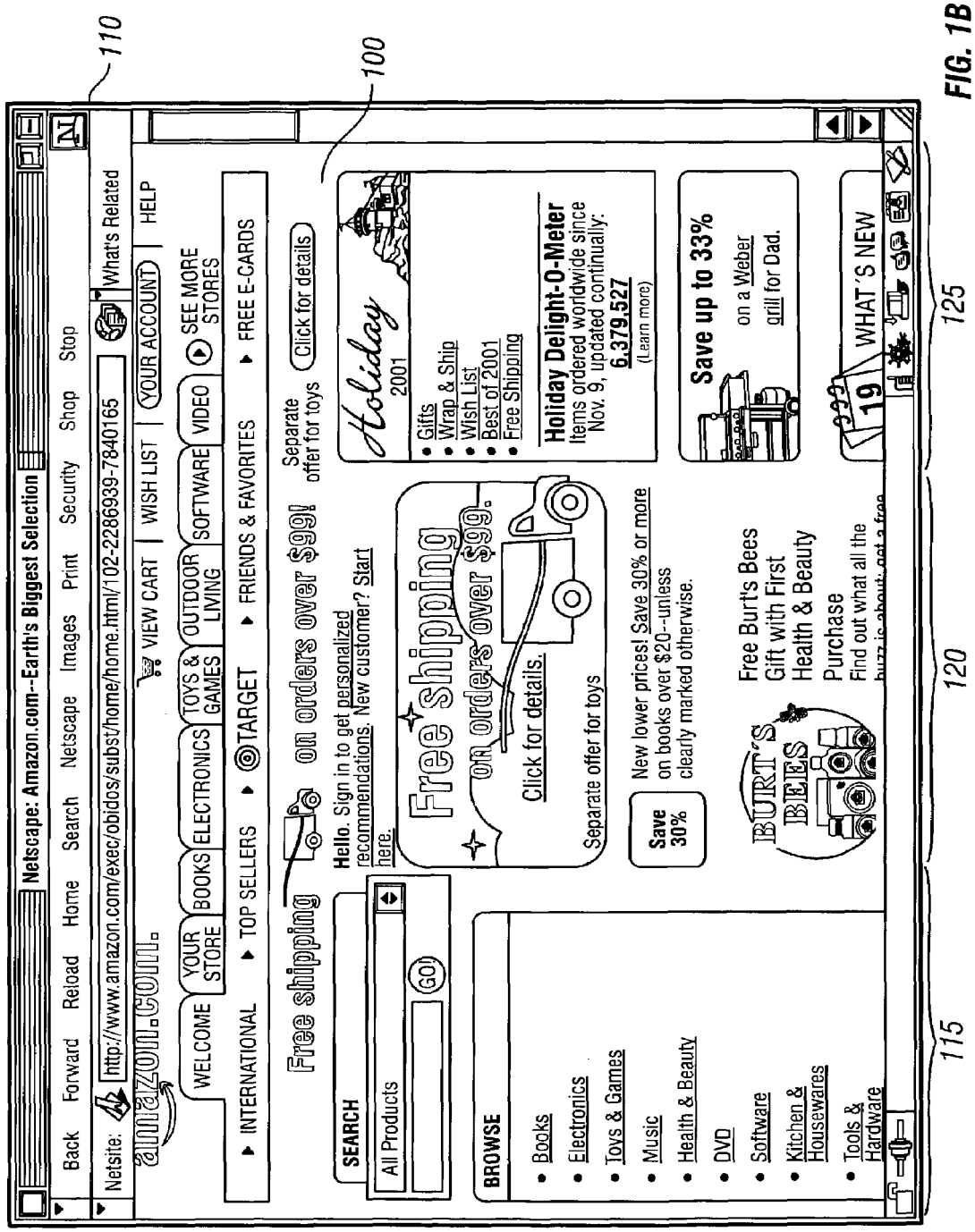

FIG. 1B shows the page 100 on a device having a smaller display window 110. As shown, the page width is reduced to fit the width of the display window 110 by reducing the width of columns 115, 120 and 125 presented in the display window 100 relative to the width of corresponding columns 130, 135 and 140 in the display window 105. In particular, the center column 120 in the display window 110 is substantially narrower than the corresponding center column 135 in the display window 105.

Figure 1C:
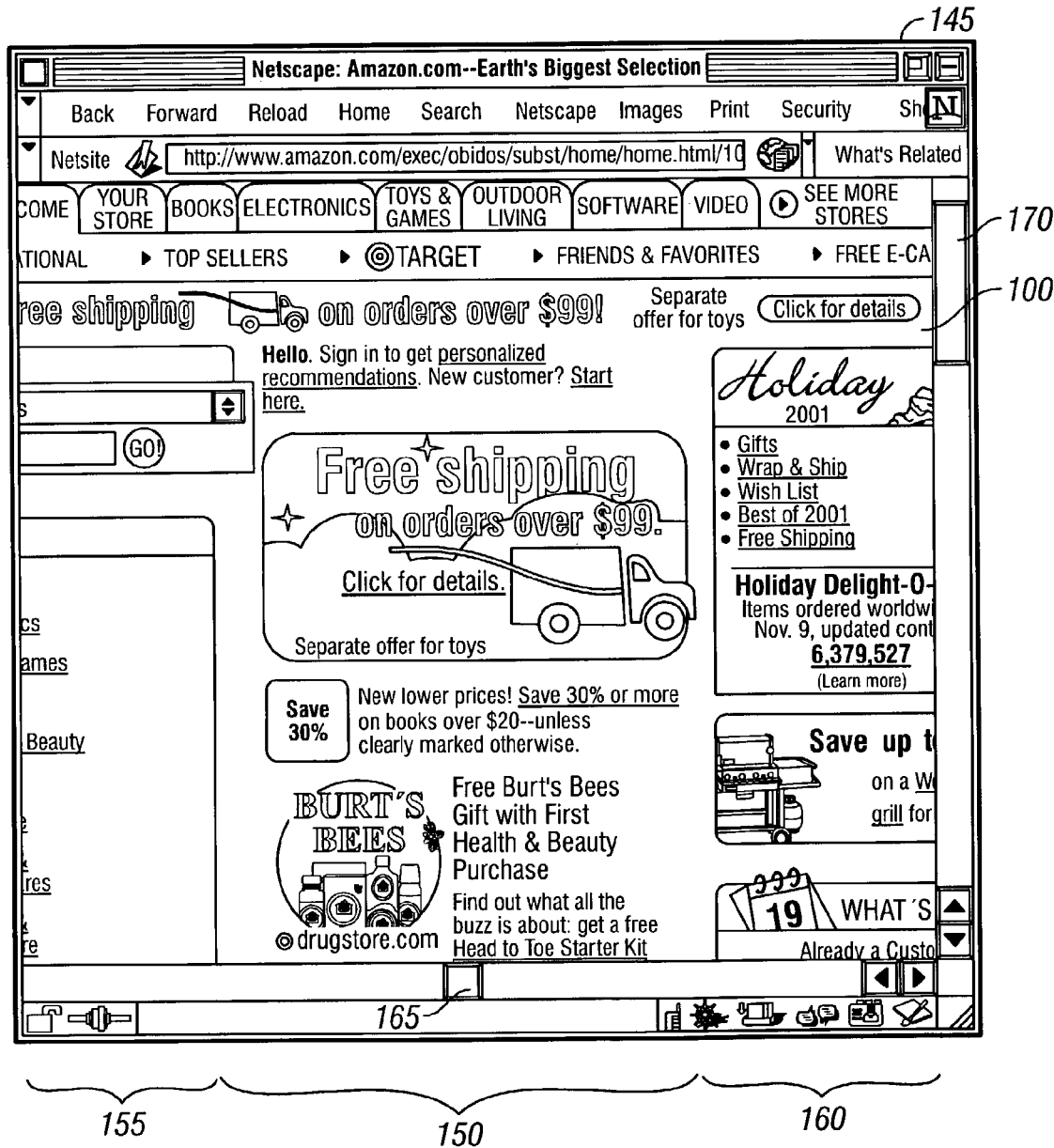

The width of the columns may only be reduced until a minimum width for the page is reached. FIG. 1C shows the page 100 in a display window 145 that is narrower than the established minimum width of the page 100 such that the page 100 exceeds the bounds of the display window 145 and only a portion of the page 100 is displayed by display window 145. As shown, the entire width of the center column 150 is displayed, while only portions of the left column 155 and the right column 160 are displayed. The display window 145 also includes a horizontal scroll bar 165 and a vertical scroll bar 170 for use in selecting and viewing the columns and the portions thereof that are displayed.

Figure 1D:
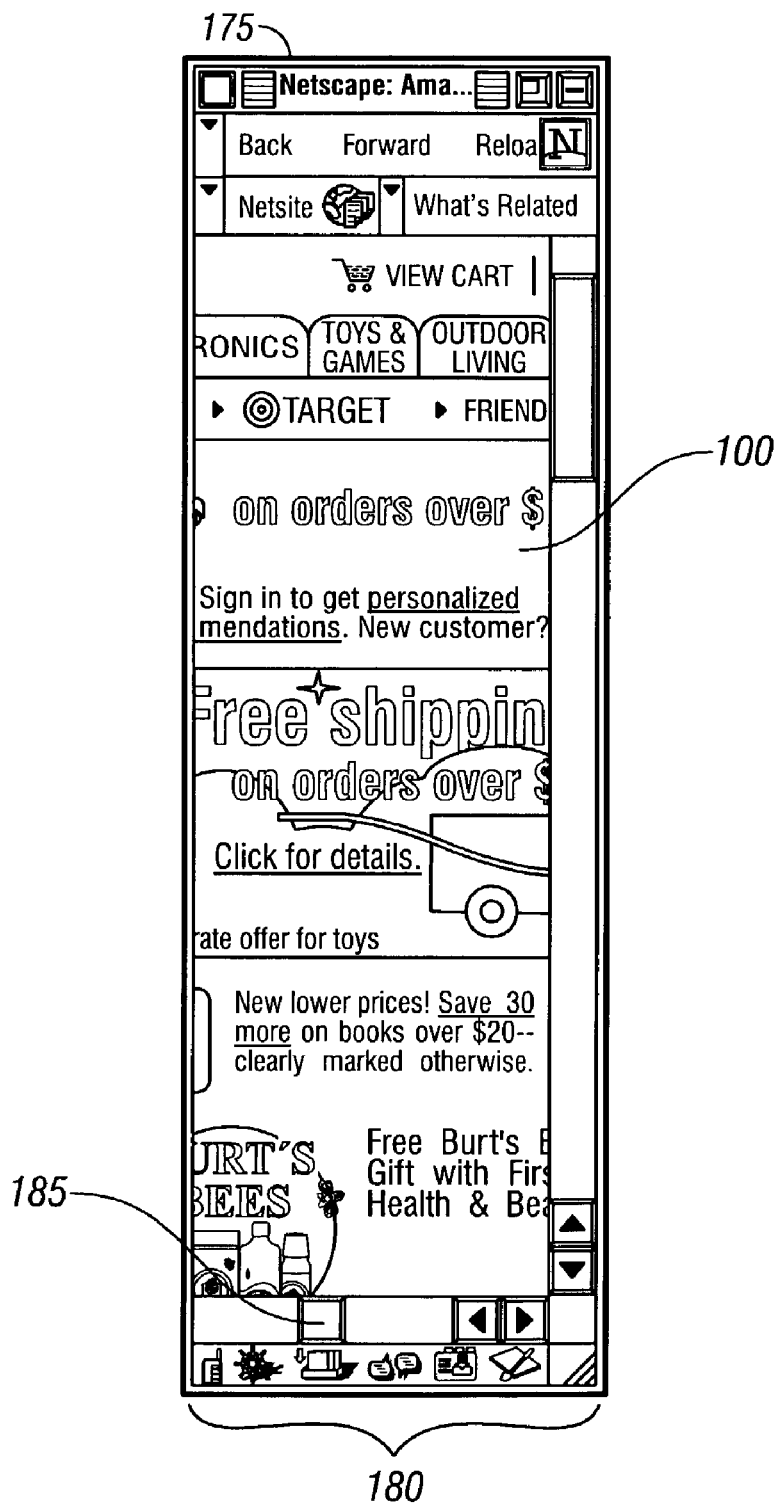

In some cases, the display window is narrower than the width of a single column. For example, FIG. 1D shows the page 100 in a display window 175 of a portable electronic device, such as, for example, an Internet-enabled cellular telephone. As shown, only a portion of a single column 180 is displayed. As a result, the user must scroll back and forth horizontally, using, for example, a scroll bar 185, to read each line of text.

Figure 2:
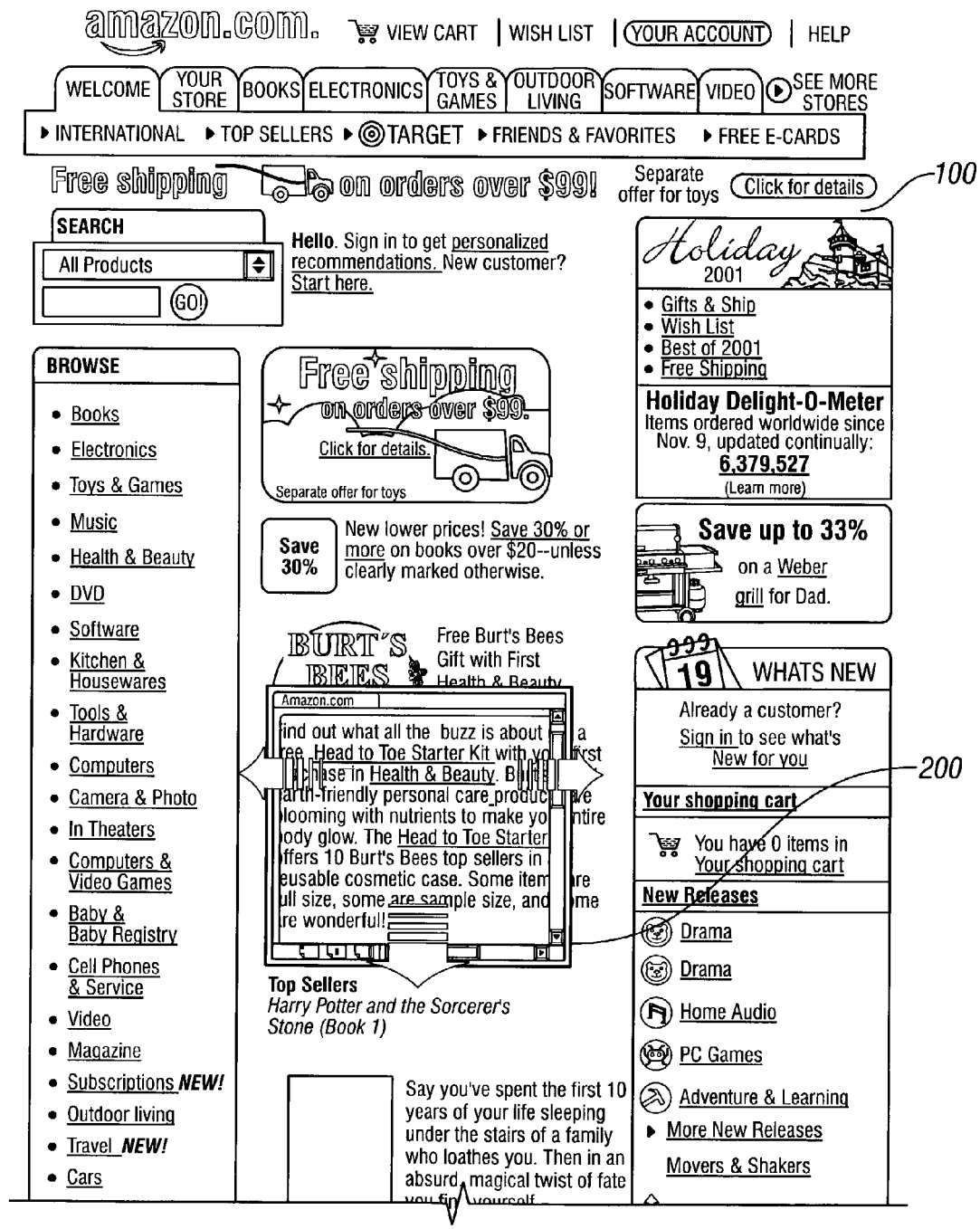
FIG. 2 illustrates a display window superimposed onto a page.

FIG. 2 illustrates a display window 200 superimposed onto the page 100. The display window 200 is representative of the display of, for example, a PDA. Since the page and column are each larger than the display window 200, the user must scroll back and forth to read each line of text. PDA browsers may use various reformatting methods to enhance the readability of the page. Reformatting may include scaling down images, text size, and other page components.

Figure 3:
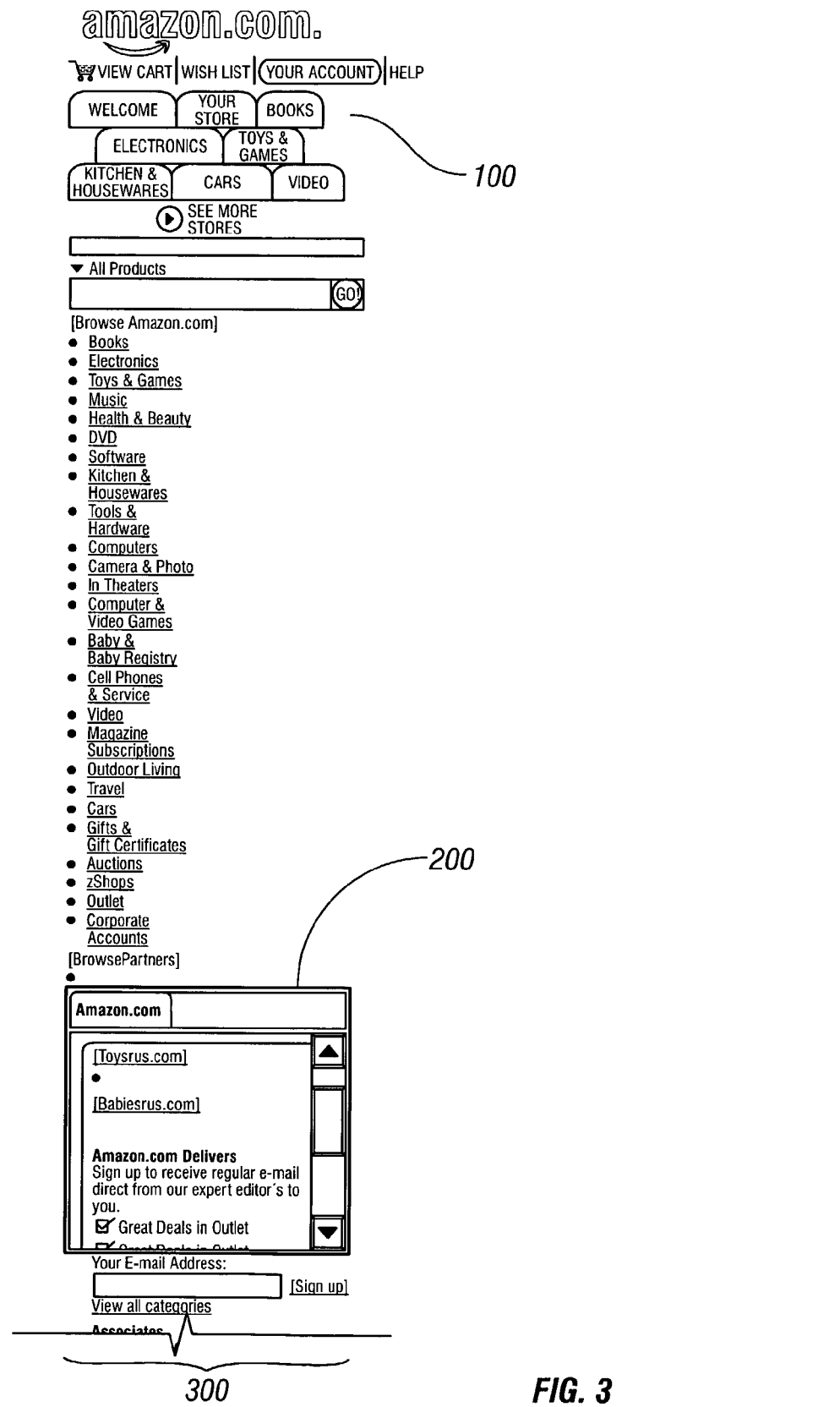
FIG. 3 illustrates a display window superimposed onto a column of information from a page.

FIG. 3 shows the page 100 reformatted as a single column 300. In particular, the columns of the page 100 are stacked to form the single column 300, the width of the column 300 is limited to the width of the display window 200, and word wrapping is used to provide continuity/readability. The display window 200 stays centered on the column as the user scrolls down the page to read the text.

Figure 4A:
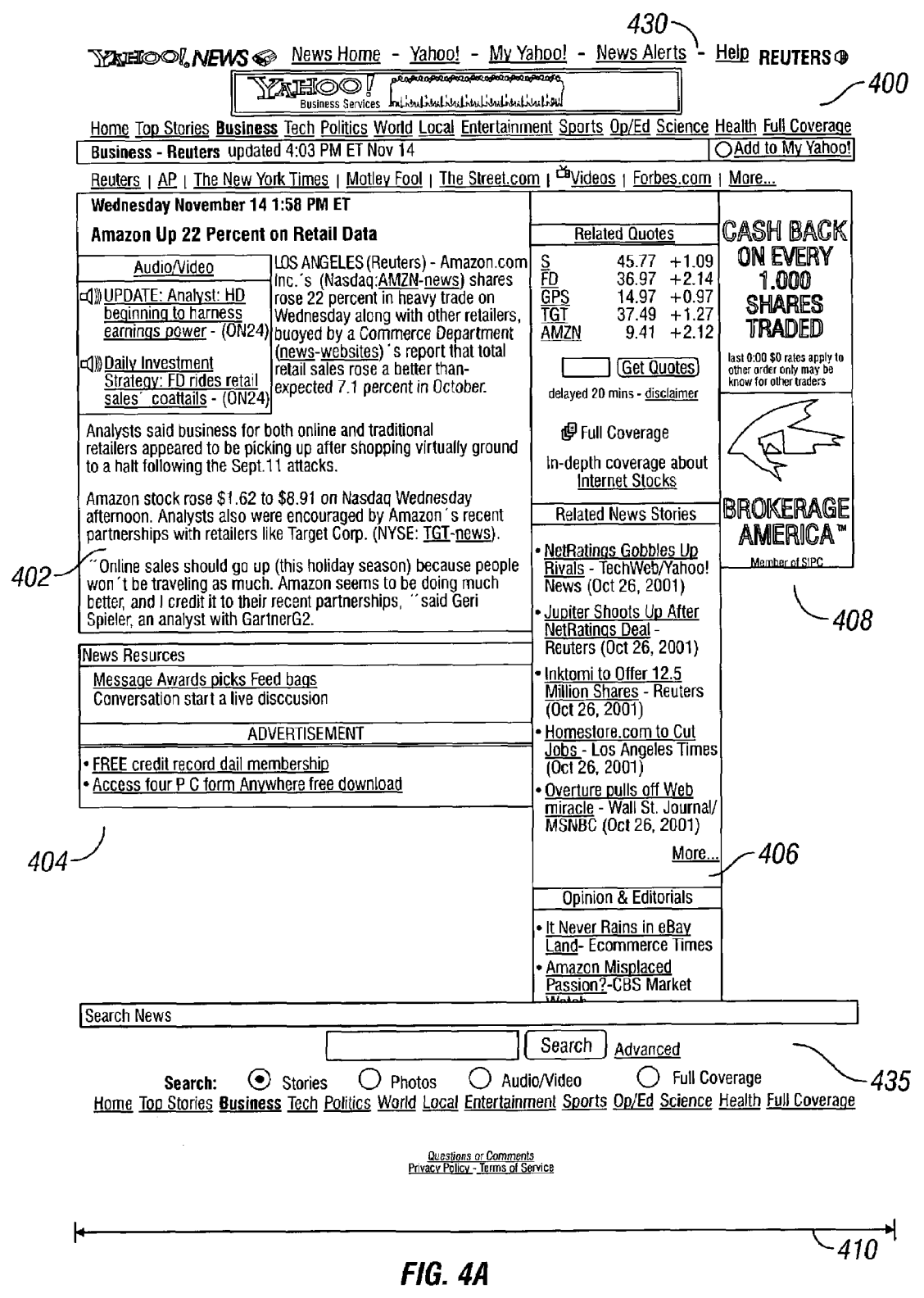
Figure 4B:
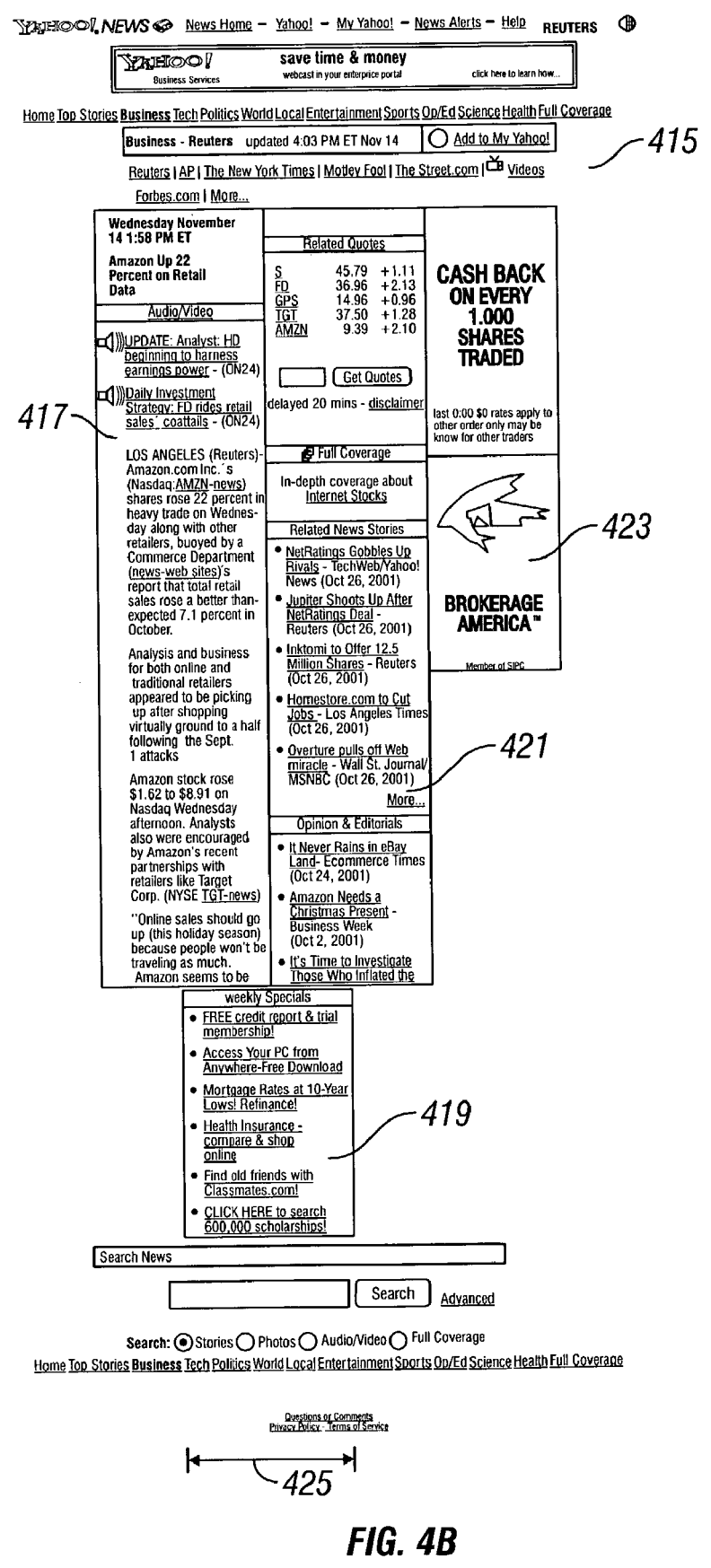

FIGS. 4A and 4B show that a page 400 (FIG. 4A) having elements 402, 404, 406 and 408 of differing widths and sized to fit a wide window width 410 may be reformatted as a page 415 (FIG. 4B) having elements 417, 419, 421 and 423 with widths corresponding to the width 425 of a narrow display (e.g., a PDA display). The elements 417, 419, 421 and 423 are readable columns of information that each fit within the width 425 of the display window or can be reduced to a width that does not exceed the width of the display window 425. The elements 417, 419, 421 and 423 are aligned to correspond with the topology of the page 400. Thus, even though the page 415 exceeds the viewing boundaries of the display window, the user can view various portions of the page 415 with a better sense of the orientation of the content on the page 415 and can navigate on the page 415 more easily. Each column of text can be read without requiring the user to scroll back and forth horizontally. Instead, the user scrolls down as if reading a newspaper column.

Reformatting a page requires identification of the page topology from the page format coding. As shown in FIG. 4, a common HTML page topology includes a header 430 with no logical columns, a body including one or more logical column elements 402, 404, 406 and 408, and a colophon 435 with no logical columns. Other variations of this topology include a header, a first body having N columns, another header, a second body having M columns, with M being the same as or different from N, and a colophon; a header, multiple bodies, and a colophon; a header, a body, and no colophon; no header, a body, and no colophon; or a header, no body, and no colophon.

The topologies described above have some common features. For example, the headers usually do not contain long paragraphs of text. Thus, headers seldom need to be reformatted for the display window of the PDA viewing device. In the event that the header is wider than the display window, navigation through the header is not difficult for the user. Similarly, the colophon usually does not contain long paragraphs of text and may be easily navigated. Typically, the body or bodies are laid out in one or more columns. The columns can be constrained to the window width to enhance readability, as described with respect to FIGS. 3, 4A and 4B. Based on these topologies, most HTML pages are readily reformatted into constrained sets of logical columns, with no column exceeding the display width.

Figure 5:
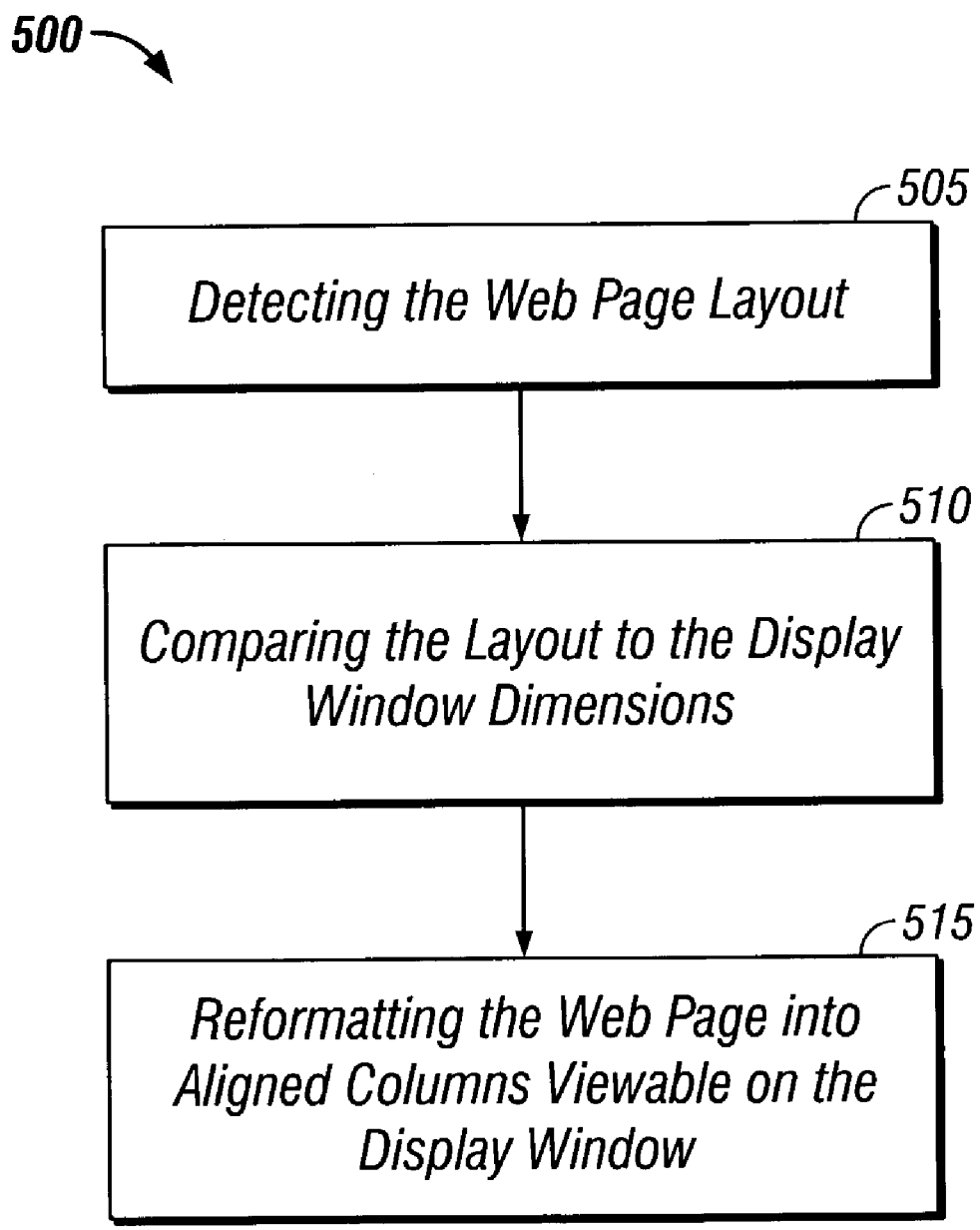
FIG. 5 is a flow chart of a method of reformatting a page.

Referring to FIG. 5, a process 500 for enabling viewing of a page on a display includes detecting the page layout (step 505), comparing the layout to the dimensions of the display window (step 510), and reformatting the page into aligned columns that are viewable on the display (step 515). In one implementation, the page layout is detected (step 505) by separating the layout of the page into components and then analyzing those components. The page coding may be identified to recognize formatting codes. For example, HTML code includes identifiable header, body, or table tags. Once the HTML tags are identified, the page may be recoded in a language other than HTML for easier viewing on the small display window.

The width of each logical column is less than or equal to the display window width. The logical columns may be produced by comparing the width of each column of the page to a width of the display window and establishing a new column width that does not exceed the display window width. Typically, the new column width is smaller than the original column width. However, in some implementations, a column that is narrower than the display window width may be widened to have a new width that does not exceed the display window width. The logical columns then are aligned for viewing on the display.

When the display is part of a client of a client/host architecture, the host may be notified of the display window size from information residing at the client or residing at the client. For example, the host may be notified upon establishment of a connection between the client and the host, at time intervals after establishing the connection between the client and the host, or after any change in the display window size. The host then may reformat the page based on the display window size prior to delivery to the client. Alternatively, the client may perform the reformatting.

Typically, PDA navigation is performed by using scroll bars to move on or between pages of information on the display.

Figure 6:
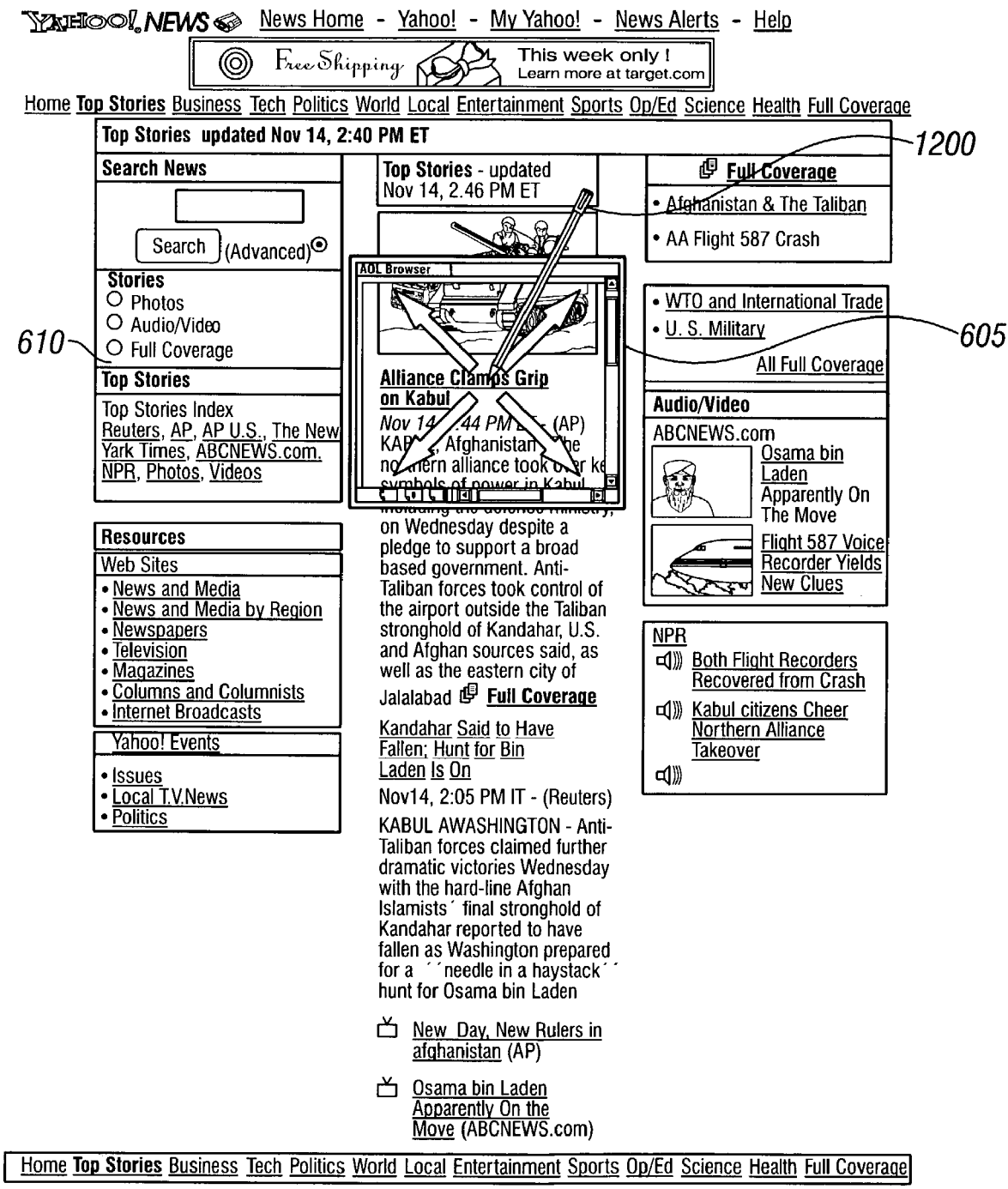
FIG. 6 illustrates a display window and pen stylus superimposed onto a page.

Referring to FIG. 6, another common PDA navigation feature is the capability to scroll the display window by placing a stylus 600 on the display window 605 and then dragging the stylus 600. However, such "touch-and-drag" scrolling can result in information 610 that is positioned in the display window 605 but is difficult to view or read since the user may inadvertently navigate to a position where only a portion of a column or an image is visible in the PDA display window 605.

Figure 7:
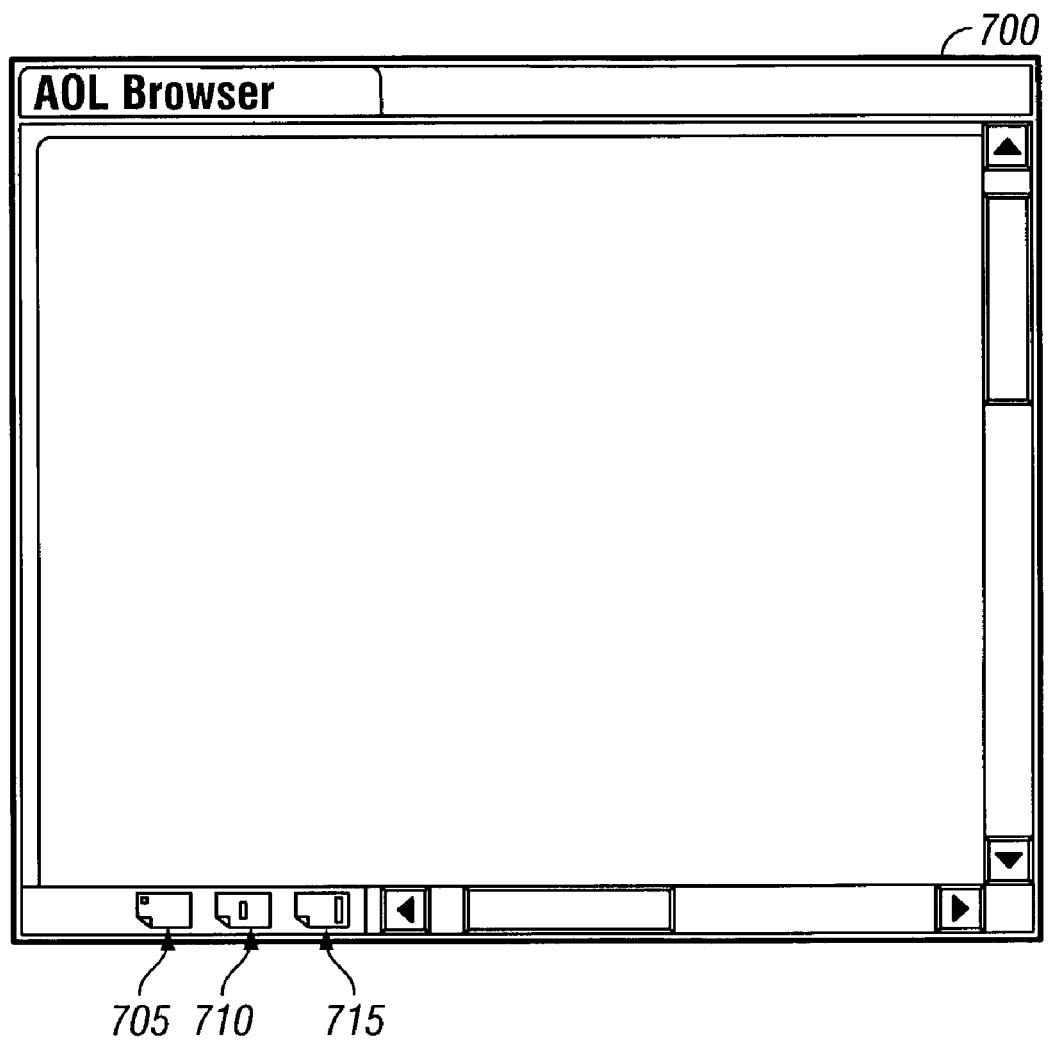
FIG. 7 illustrates a display window with navigation buttons.
Figure 8A:
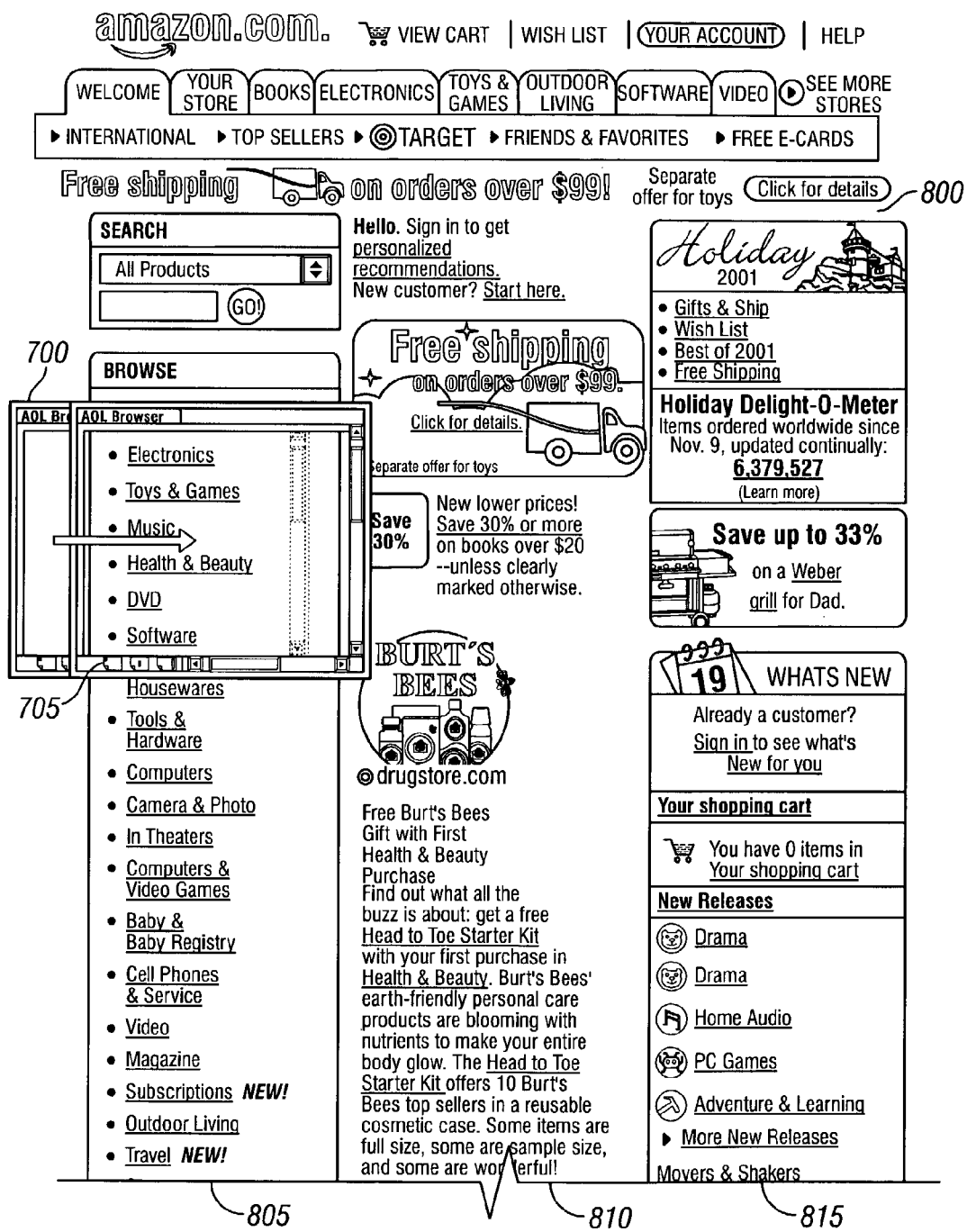
FIGS. 8A-8C illustrate display windows superimposed onto a page.
Figure 8B:
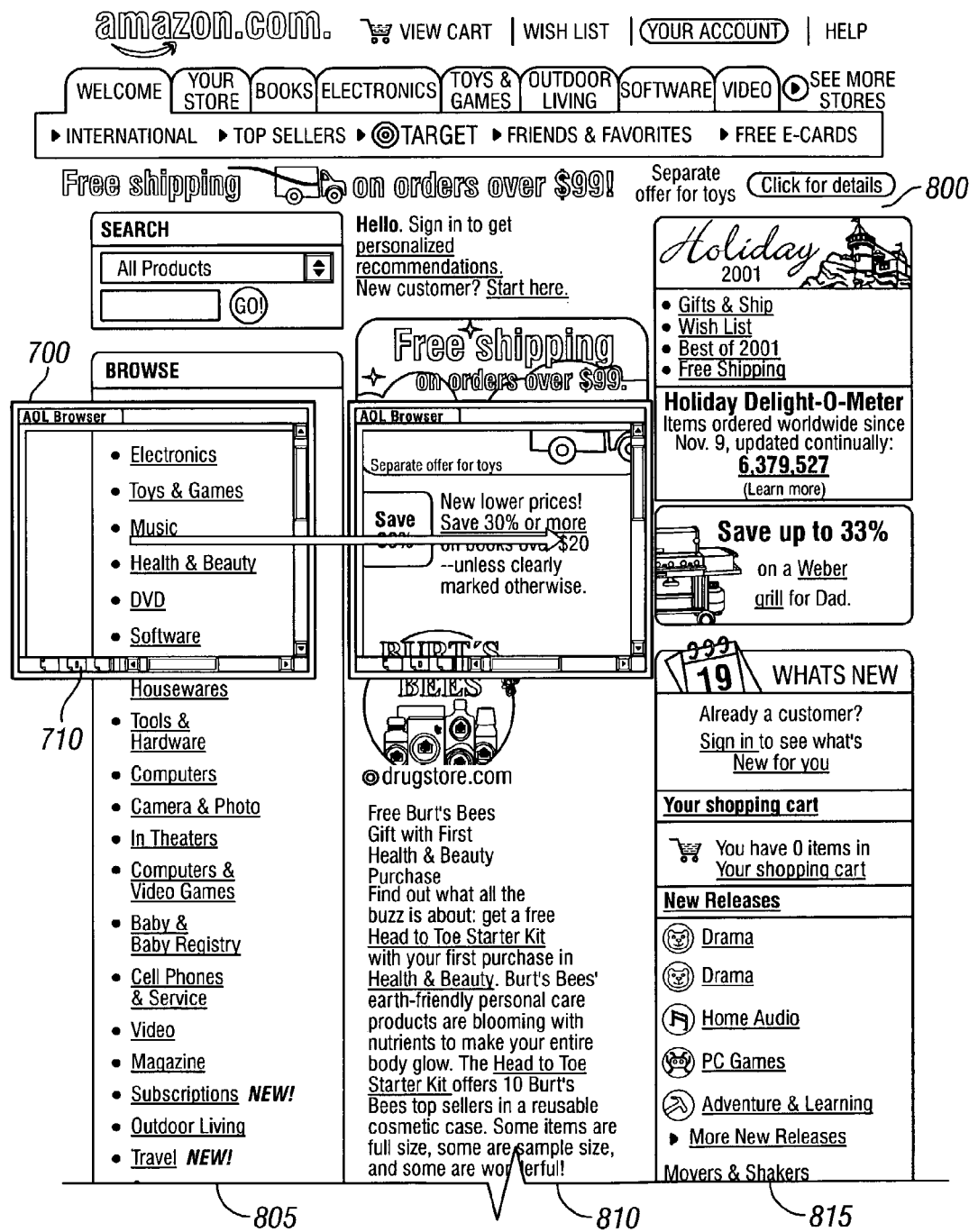
Figure 8C:
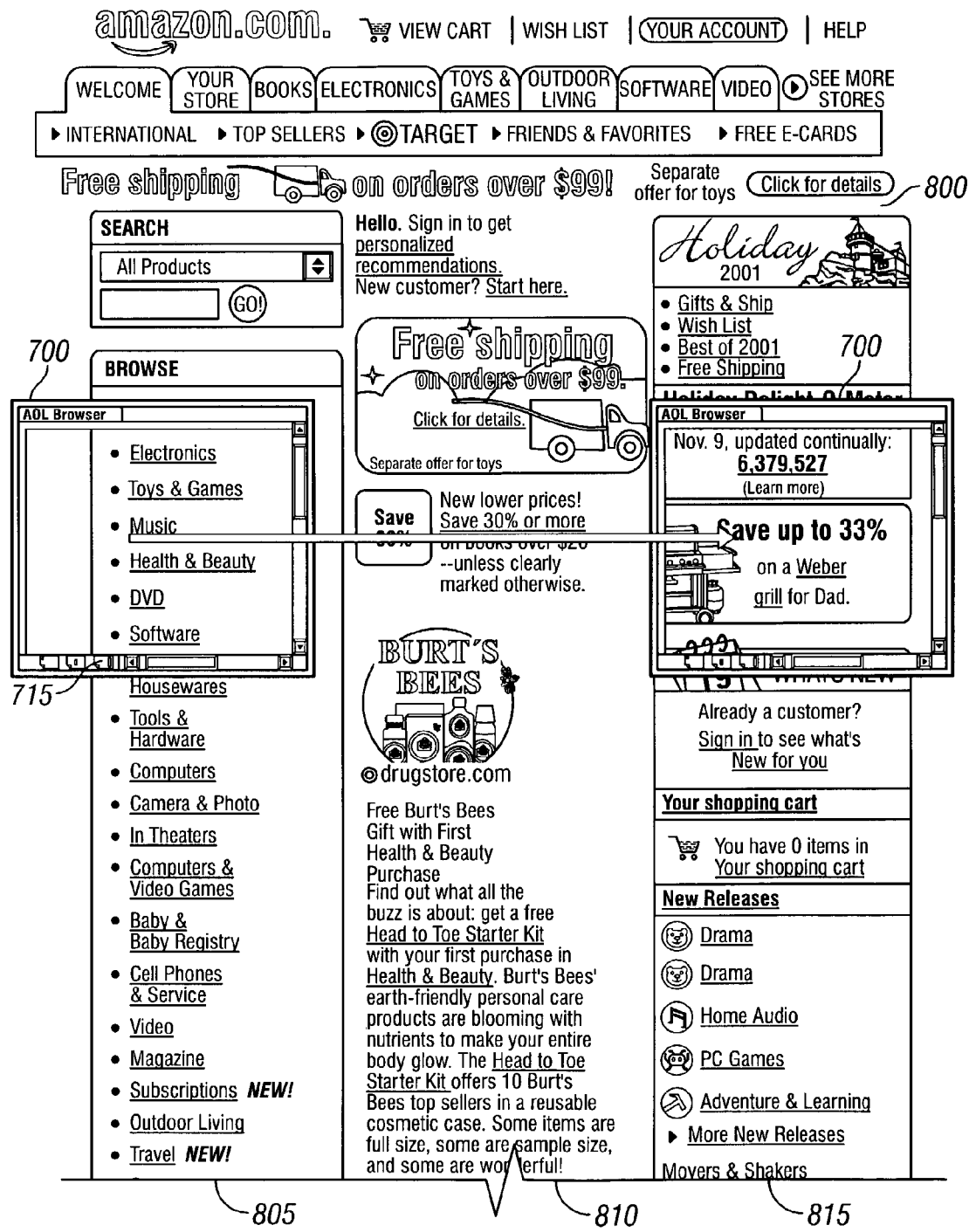

Referring to FIG. 7, to aid user navigation to view a desired text column, a display window 700 includes small icons 705, 710, and 715 that represent navigation buttons. Each of navigation buttons 705, 710 and 715 represents a logical column of the page currently being viewed. The navigation buttons 705, 710 and 715 provide the user with a graphical representation of the number of logical columns 700 available on the page. In other implementations, the navigation buttons correspond to columns of predetermined absolute or relative position within the page (e.g., leftmost column, rightmost column, left adjacent column, right adjacent column or center column). Each button also is used to properly position the display window 700 on the corresponding column of text when the user selects the icon. For example, referring to the tri-column display of FIG. 8A, when the user selects the left-most navigation button 705, the window 700 is positioned on the left-most or first logical column 805 of a page 800. Referring to FIG. 8B, when the user selects the central navigation button 710, the window 700 is positioned on the second logical column 810 of the page 800. Referring to FIG. 8C, when the user selects the right-most navigation button 715, the window 700 is positioned on the third or right logical column 815 of the page 800.

The number of navigation buttons can vary according to the number of logical columns. For example, if a page displayed in the window 700 has just one column, then the display includes one column navigation icon. If the page being displayed has two columns, then the display includes two column navigation icons. Depending upon the display limitations of the window, any number of icons can be displayed to correspond with the number of columns. When the element displayed in the window is one that has no logical column, such as, for example, a header or a colophon, the icons for the following or preceding logical columns may be displayed depending on the user's preference.

Figure 9:
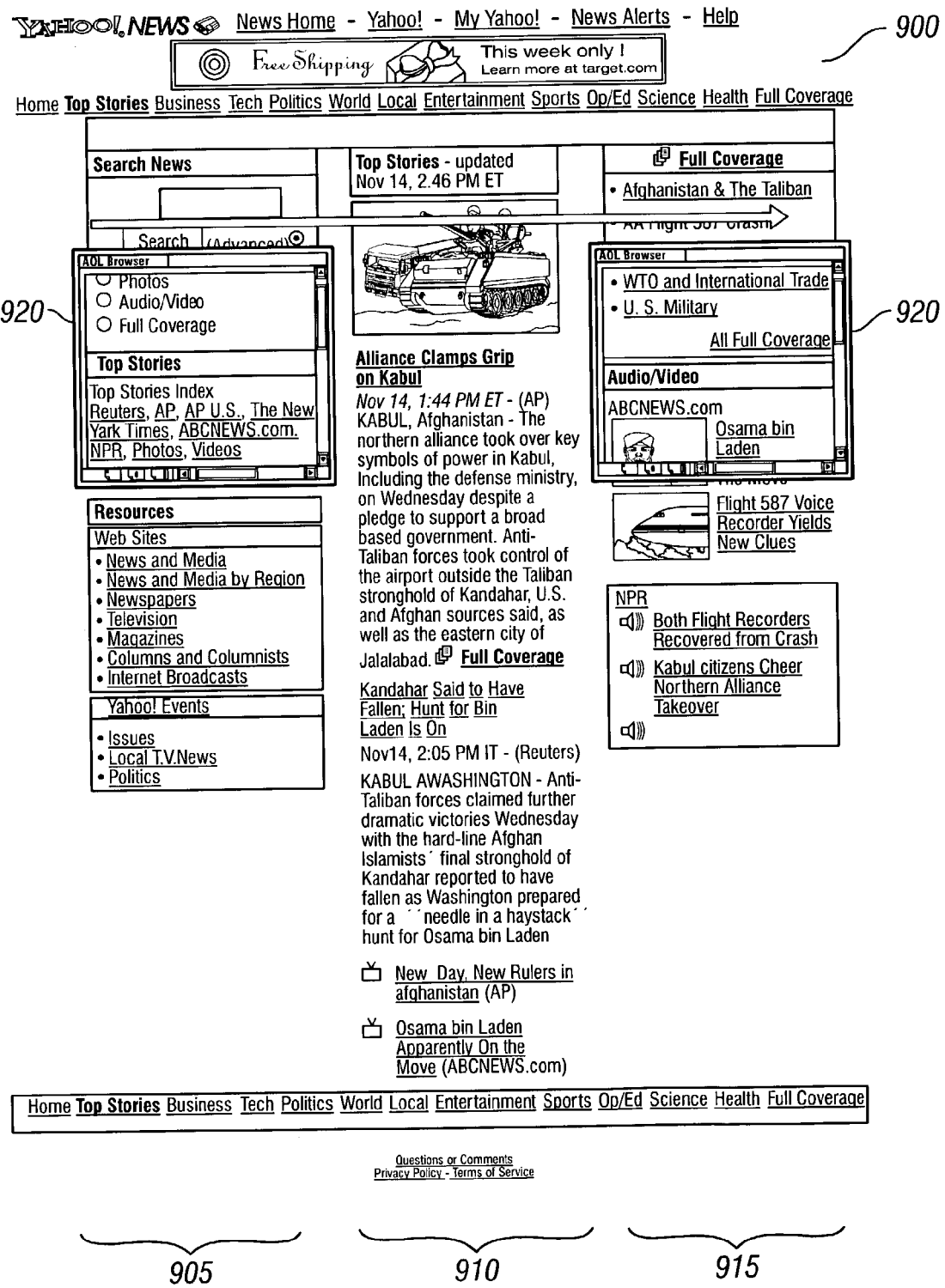
FIGS. 9 and 10 each illustrate a display window superimposed onto a page.

As the number of logical columns increases, the user has more options for jumping discretely between columns. This can cause the user to become disoriented concerning the position of the page relative to the display window, which may result in the user selecting an incorrect scrolling direction to view other parts of the page. For example, referring to FIG. 9, the user may begin viewing a page 900 by selecting a first column 905 of columns 905, 910 and 915 for display in the window 920. The user then may decide to jump to the third text column 915 to view the information in that column. Subsequently, the user may decide to return to the previously viewed first column 905. However, since the appearance of the display window 920 changed instantaneously when the used jumped discretely between the text columns 905 and 915, the user may not recall the position of the previously-viewed text column relative to the currently-displayed column.

Figure 10:
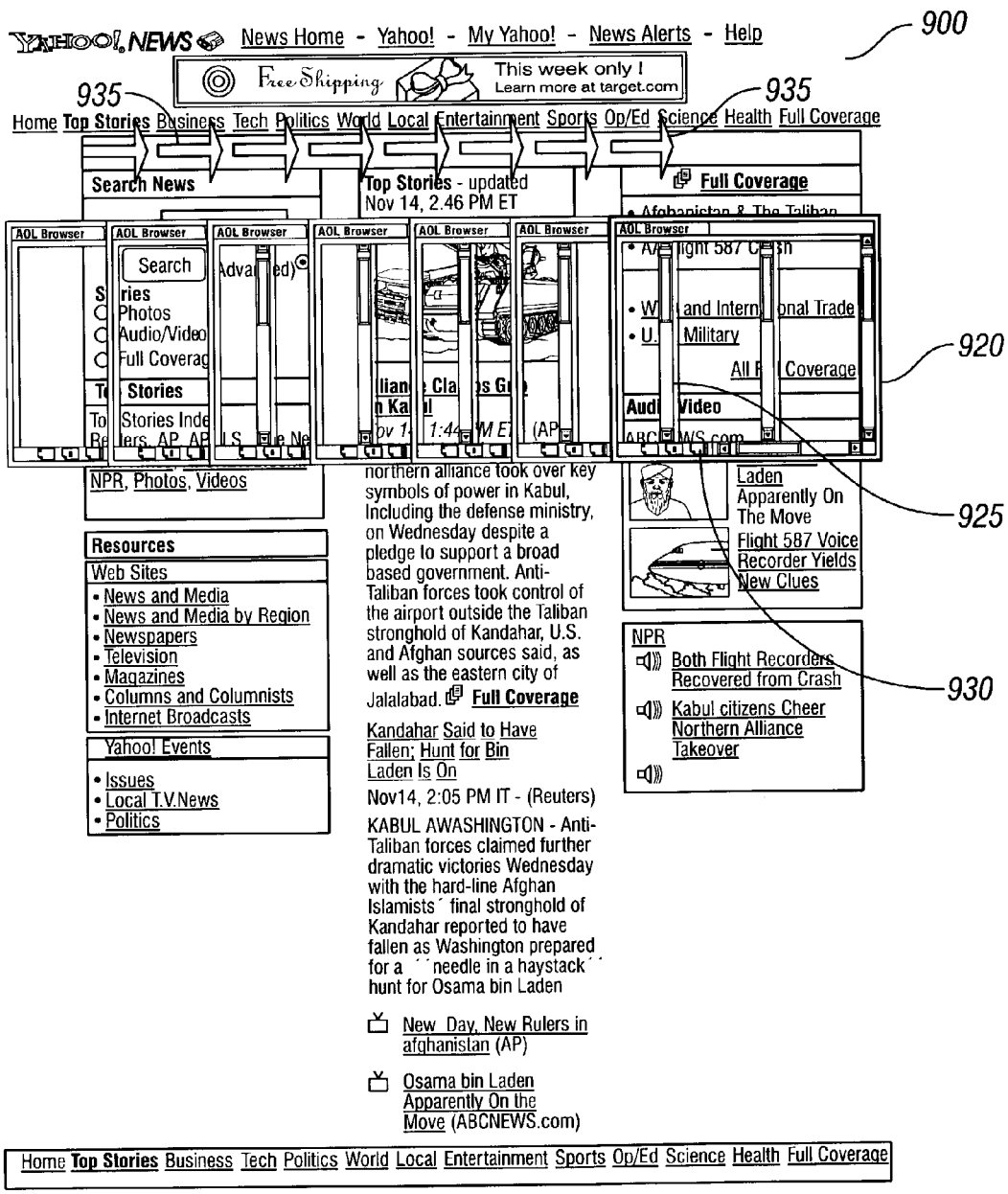

Referring to FIG. 10, as the user navigates to various positions on the page 900, animation effects 925 are provided to give the user a better sense of direction and position. The animation effects add a sense of motion to the content being displayed. For example, in one implementation, when the user actuates a navigation button 930 to move to a new location on the page 900, the user sees the page 900 slowly scrolling across the display window, as represented by the series of arrows 935 in FIG. 10, until the new location is centered on the display window 920. Animation also may be provided in response to a stylus or finger used on a display window with a touchscreen. The touchscreen may include, for example, a resistive sensor, a capacitive sensor, an acoustic wave sensor, or an infrared sensor.

Figure 11:
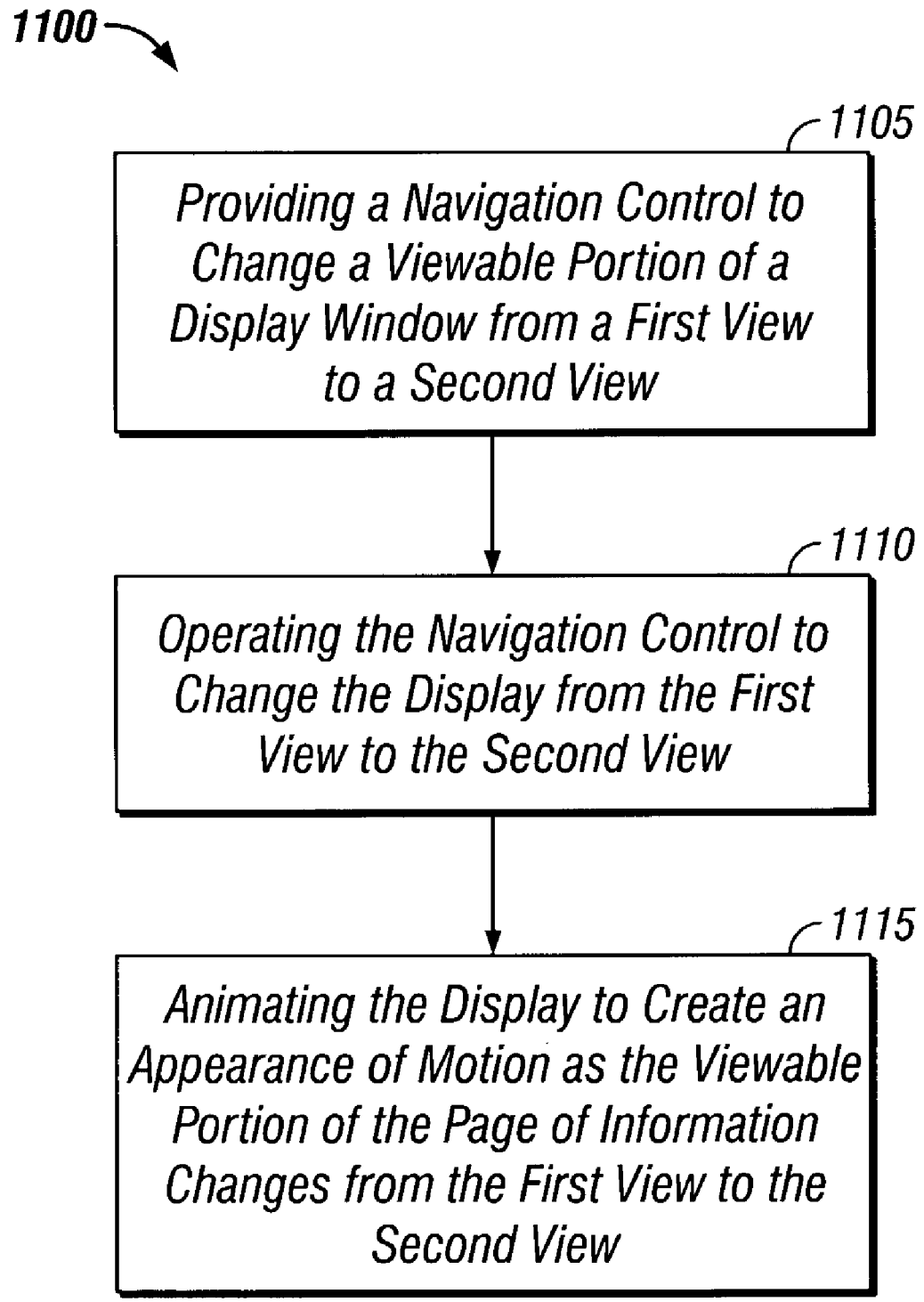
FIG. 11 is a flow chart of a method of navigating on a display window.

Referring to FIG. 11, a procedure 1100 for supporting navigation on a display includes providing a navigation control operable to change a viewable portion of a page of information on a display from a first view to a second view (step 1105), permitting operation of the navigation control to change the display from the first view to the second view (step 1110), and animating the display to create an appearance of motion as the viewable portion of the page of information changes from the first view to the second view (step 1115). Operation of the navigation control may include operation of a device such as a mouse or trackball, use of a stylus, or use of a voice command.

Animation on the display may include one or more animation effect. For example, animating the display (step 1115) may include slowly scrolling or shifting the display content to give the display an appearance of slow motion. In another implementation, animating the display (step 1115) includes illustrating a visible portion of the page of information moving continuously on the display from the first view to the second view. In a further implementation, animating the display (step 1115) includes drawing a line from the first view to the second view. In still a further implementation, animation (step 1115) includes displaying a reference marker moving from the first view to the second view. This may be done, for example, using a separate window or portion of the display. In one implementation, the user selects a velocity at which to change the viewable portion of the page from the first view to the second view. In another implementation, the user selects an acceleration at which to change the viewable portion of the page of information from the first view to the second view. The user also may select a constant or variable velocity or acceleration. For example, the user may select a variable velocity that begins scrolling the display slowly, picks up speed, and then slows down again as the displayed portion approaches the second view.

Figure 12:
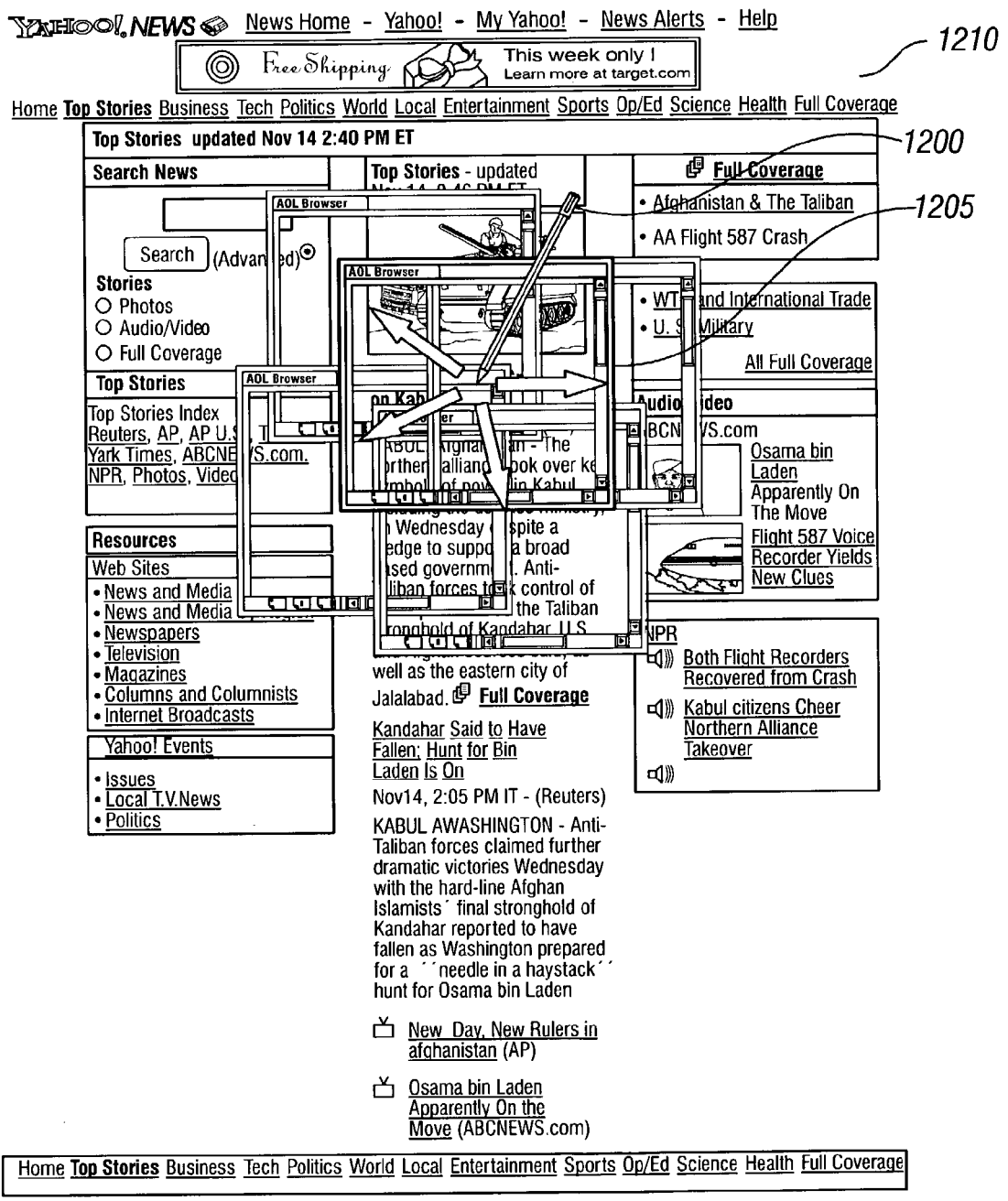
FIGS. 12, 13, 14A and 14B each illustrate a display window superimposed onto a page.
Figure 13:
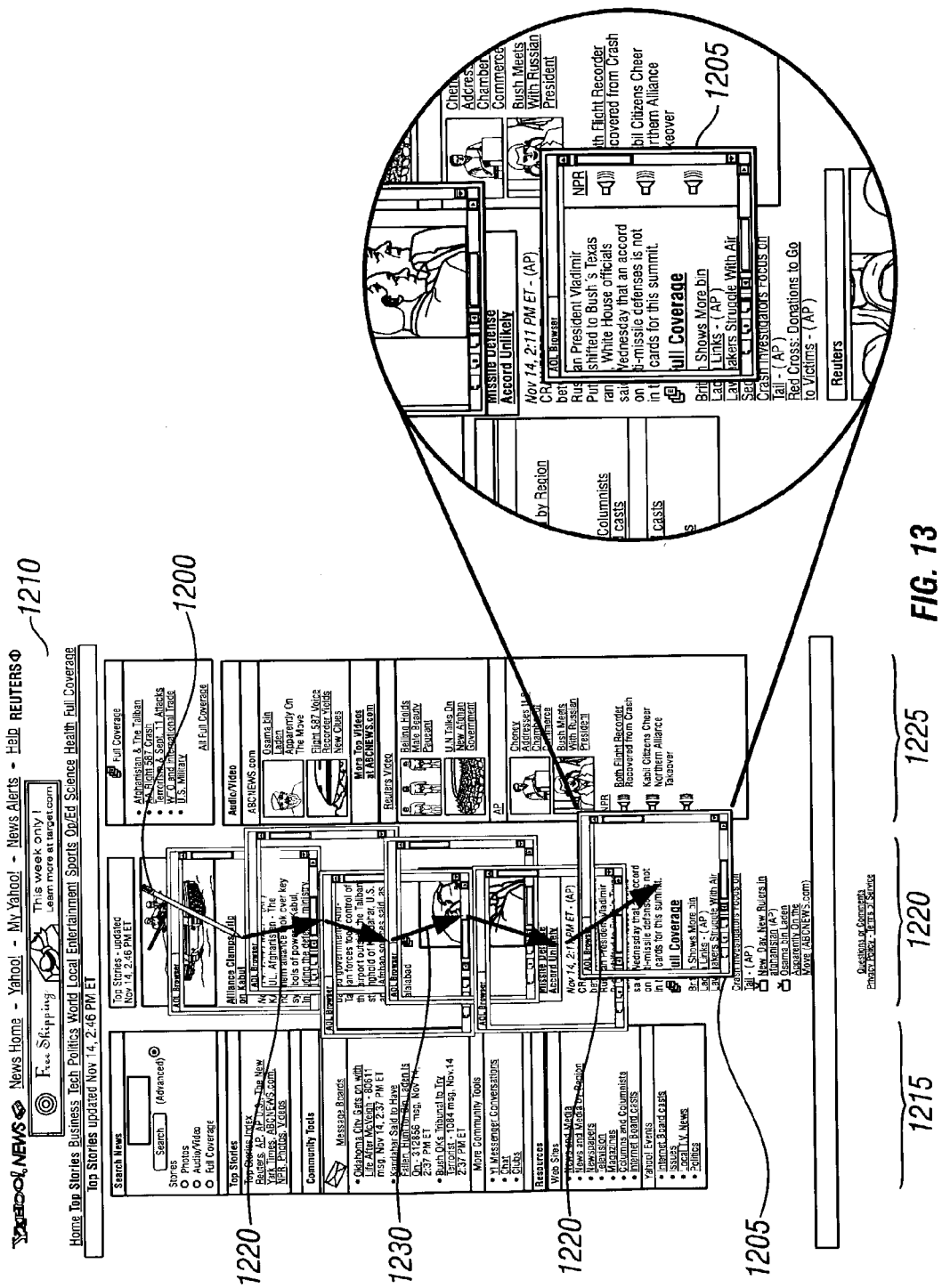

Referring to FIG. 12, on a stylus-based PDA, the user can use a stylus 1200 to scroll a display window 1205 vertically down a page 1210 in order to read a column 1215, 1220 or 1225 of text of the page 1205. However, referring to FIG. 13, vertical touch-and-drag scrolling has a drawback in that slight horizontal motion or "wobbling" of the pen 1200, as represented by the series of arrows 1230, can cause the text column 1125, 1220, or 1225 to become misaligned on the display 1205, resulting in a misalignment between the column 1215, 1220, or 1225 and the display window 1205. To correct for this and to view a desired one of the columns 1215, 1220, or 1225 in one view, the user manually centers the desired column in the display window 1205 by making one or more left or right corrections to the stylus 1200.

Figure 14A:
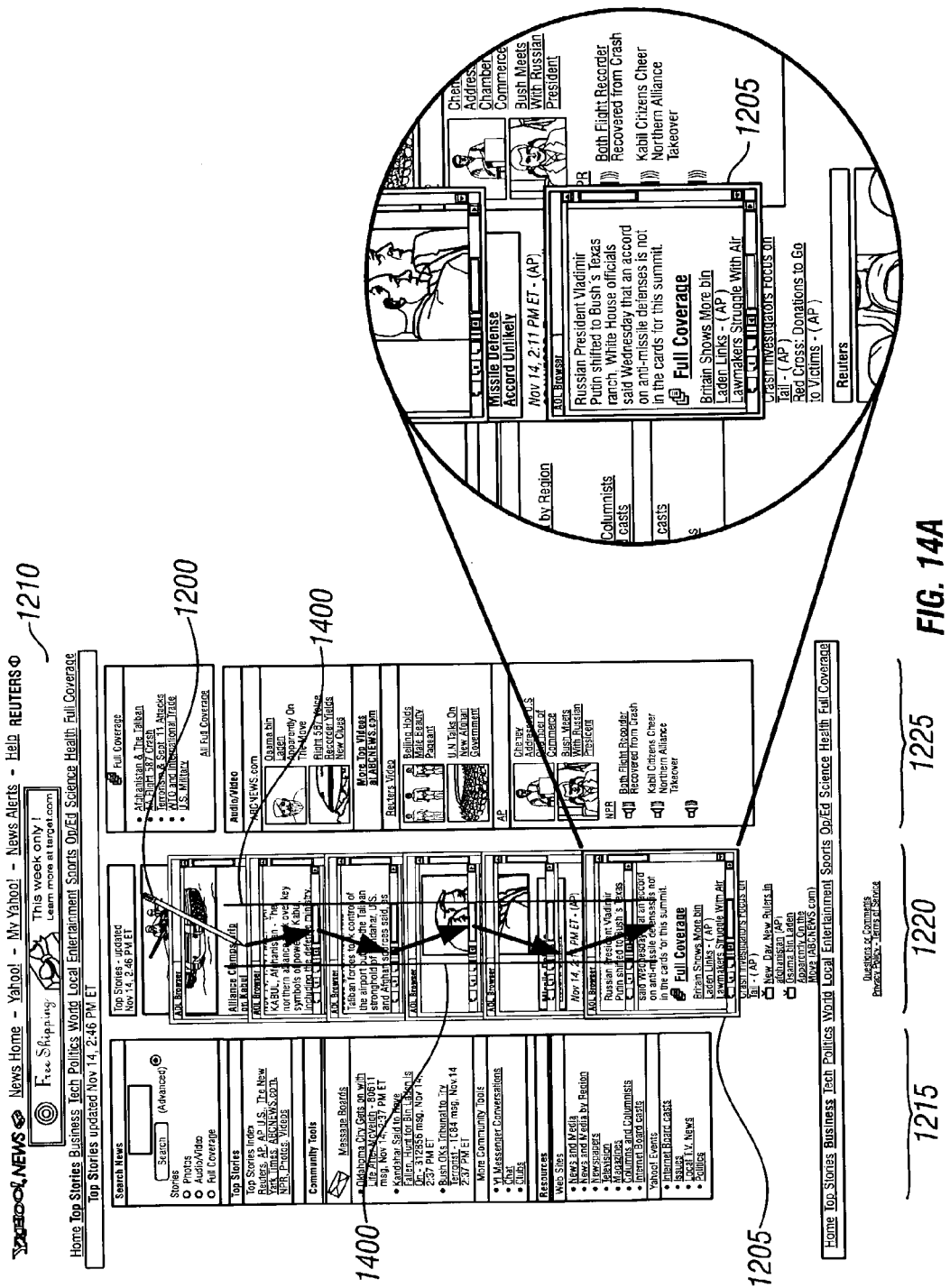

Referring to FIG. 14A, a vertical alignment control, as represented by the vertical bars 1400, can minimize wobble of the display 1205 during vertical scrolling with the pen 1200. As the user scrolls the page up or down with the stylus 1200, the vertical alignment control ignores slight horizontal motion such that the text column 1220 remains aligned in the display window 1205. This is based on the assumption that, when the window 1205 is positioned over a logical column 1220 and the user drags the pen up or down without significant horizontal motion, the intention of the user is to view only the logical column 1220. Based on this assumption, the alignment control constrains screen scrolling to the vertical direction as long as the stylus stays between the bars 1400.

The user can define the sensitivity of the vertical alignment control. For example, the user may specify a horizontal motion threshold (i.e., the spacing between the bars 1400). If the threshold is not exceeded, any horizontal motion by the pen 1200 on the screen is ignored. If the threshold is exceeded, the displayed text moves left or right accordingly. In one implementation, the user can adjust the sensitivity of the horizontal motion by establishing a threshold for a parametric number of pixels. The two vertical bars 1400 represent the threshold of horizontal motion, measured as the parametric amount of pixels, which must be exceeded to scroll the display window 1205 left or right. The vertical alignment controls may be enabled or disabled by the user.

Figure 14B:
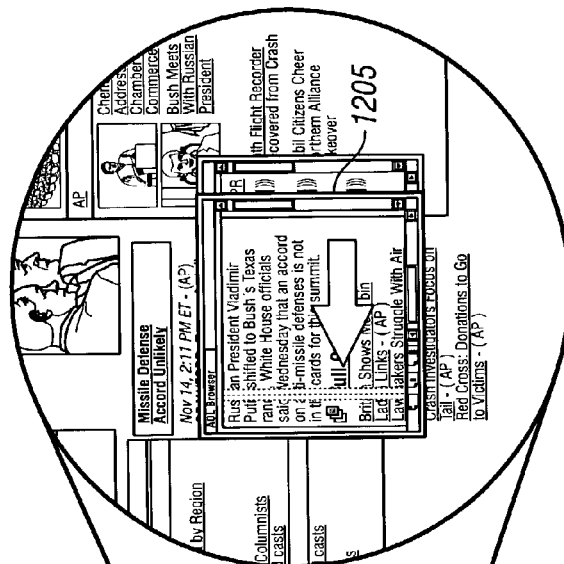
Figure 14B:
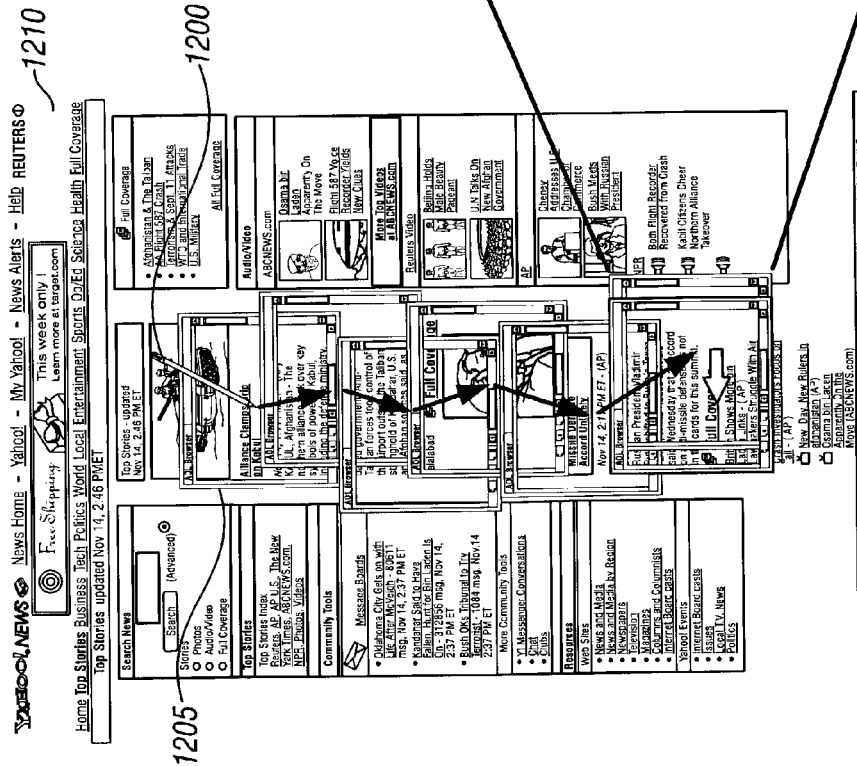

Referring to FIG. 14B, in another implementation, the vertical alignment control is enabled when the user lifts the pen 1200 from the display 1205. This causes the logical column 1220 to snap into alignment with the display window 1205 as the user stops scrolling. The user can adjust the snap sensitivity by, for example, setting the alignment control to snap to the nearest logical column based on a user-defined snap threshold. If the user's scrolling does not exceed the threshold, which indicates an intention to continue to view the text column 1220, the display 1205 centers the logical column 1210 as the pen 1200 is lifted from the screen. If the user's scrolling exceeds the threshold, which indicates an intention to move beyond the boundary of the logical column 1220, the display is snapped to the adjacent or repositioned column. In other implementations, no snapping occurs when the user's scrolling exceeds the threshold. The snap-on-column feature can also be animated to provide an appearance of movement as the display scrolls to the correct column-viewing position.

A similar horizontal alignment control also may be provided. Such a control may be used to limit vertical movement when scrolling horizontally in, for example, a spreadsheet application.

Figure 15:
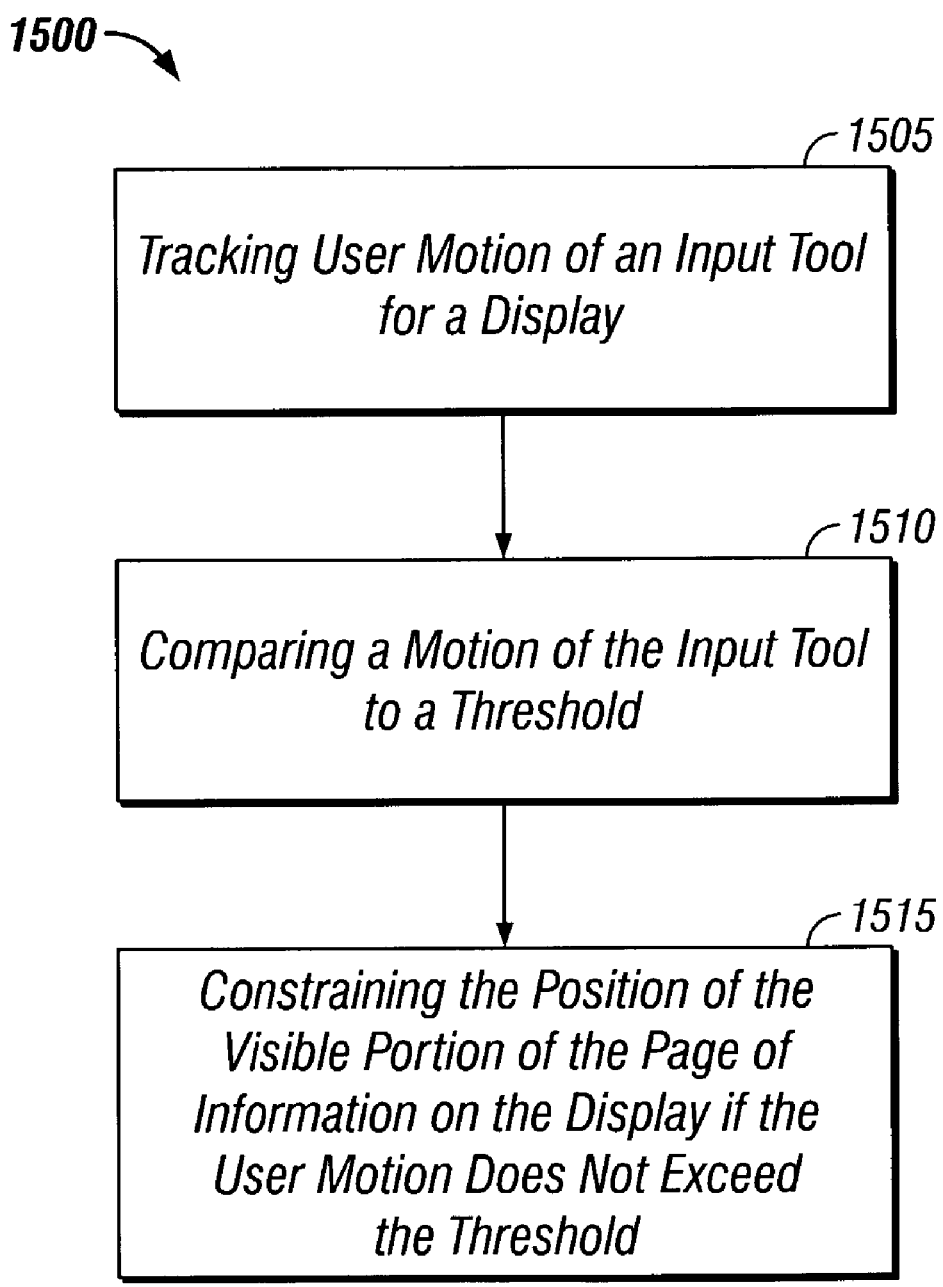
FIG. 15 is a flow chart of a method of constraining the scrolling of information on a display window.

Referring to FIG. 15, a procedure 1500 for supporting navigation on a display includes tracking user motion of an input tool for a display (step 1505), comparing a motion of the input tool to a threshold (step 1510), and constraining the position of the visible portion of the page of information on the display if the user motion does not exceed the threshold (step 1515). The input tool may be a stylus 1200 or finger used on a display window 1205 with a touchscreen. The touchscreen may include, for example, a resistive sensor, a capacitive sensor, an acoustic wave sensor, or an infrared sensor.

The method 1500 may include separating the user motion of the input tool into a horizontal component and a vertical component. The horizontal component may be compared to the threshold to constrain horizontal motion of the page 1210 in the display window 1205 if the horizontal component does not exceed the threshold. Vertical motion may be left unconstrained, or may be compared to the same or a different threshold. In other implementations, only vertical motion may be constrained.

Figure 16:
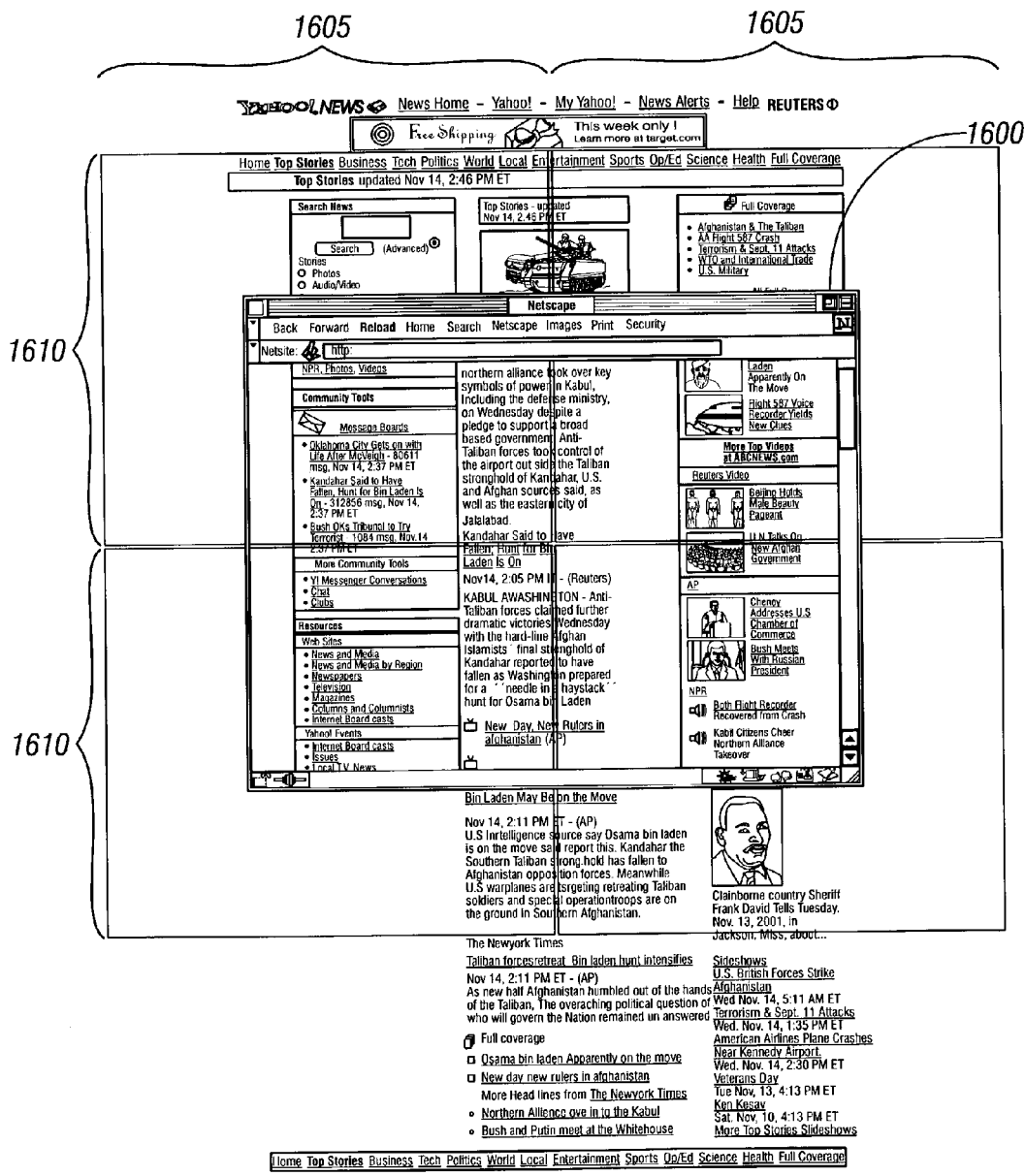
FIG. 16 illustrates a display window superimposed onto a page.

Referring to FIG. 16, touch-and-drag scrolling of a display window 1600 may be limited to the width and length of the display window. For example, as the user scrolls from left to right across the entire width 1605 of the display 1600, the document slides across the screen a distance that is equal to the width 1605 of the display 1600. Thus, movement up, down, left, or right is limited to a distance that is equal to the length 1610 or width 1605 of the display 1600. The user must then lift the pen or stylus from the screen and repeat the scrolling operation.

Typical desktop computers can associate movement of the operating system cursor with movement of the pointing device. In these systems, the cursor is both a software variable to detect user intentions and a graphic representation to provide the user with the location of the cursor. On a PDA, however, the cursor is not displayed on the screen because the tip of the pen already defines the location of the cursor. This location is forwarded to the application software by the operating system.

The operating system uses drivers that convert the movement or the position of the pointing device, which may be expressed in centimeters, to the movement of the cursor, which may be expressed in pixels. PDAs usually follow a paradigm inherited from the desktop computer, in that movement between the cursor is equivalent to movement of the document. Thus, the page scrolls an amount equal to the distance of the pen movement. For example, when the cursor moves 10 pixels, the document scrolls 10 pixels.

On a PDA or other device with a small display, scrolling the width or length of the display area provides viewing of only a small amount of document data. The user often must repeat the scrolling operation until the desired text comes into view.

A scrolling multiplier allows the user to specify movement of the document on the display as a multiplier or percentage of the physical movement of the stylus on the display. For example, referring to FIG. 17A, when the proportional movement is set to 200%, document scrolling 1700 on a display 1705 is 20 pixels for each 10 pixels of stylus or other input movement 1710. When the proportional movement is set to 50%, the document scrolling is 5 pixels for each 10 pixels of stylus or other input movement on the display. Referring to FIG. 17B, when the proportional movement is set to 300%, the document scrolling 1715 is 30 pixels for each 10 pixels of stylus or other input movement 1720 on the display 1725.

Figure 17A:
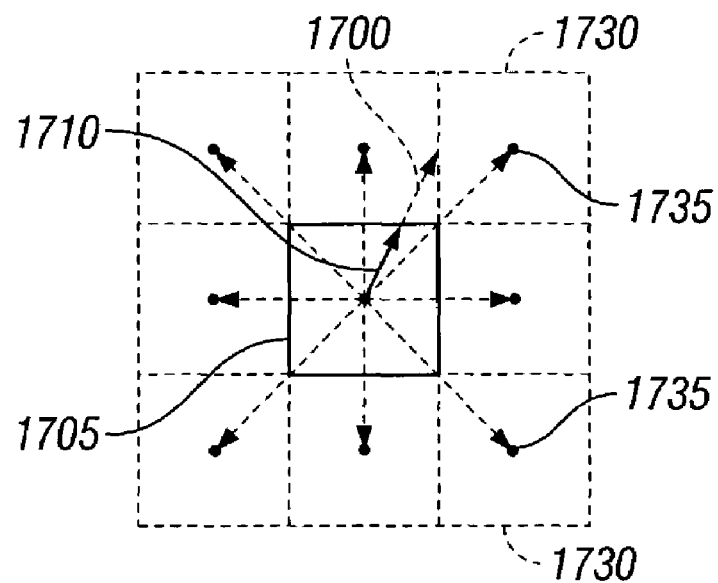
FIGS. 17A and 17B each illustrate a display window and a stylus.
Figure 17B:
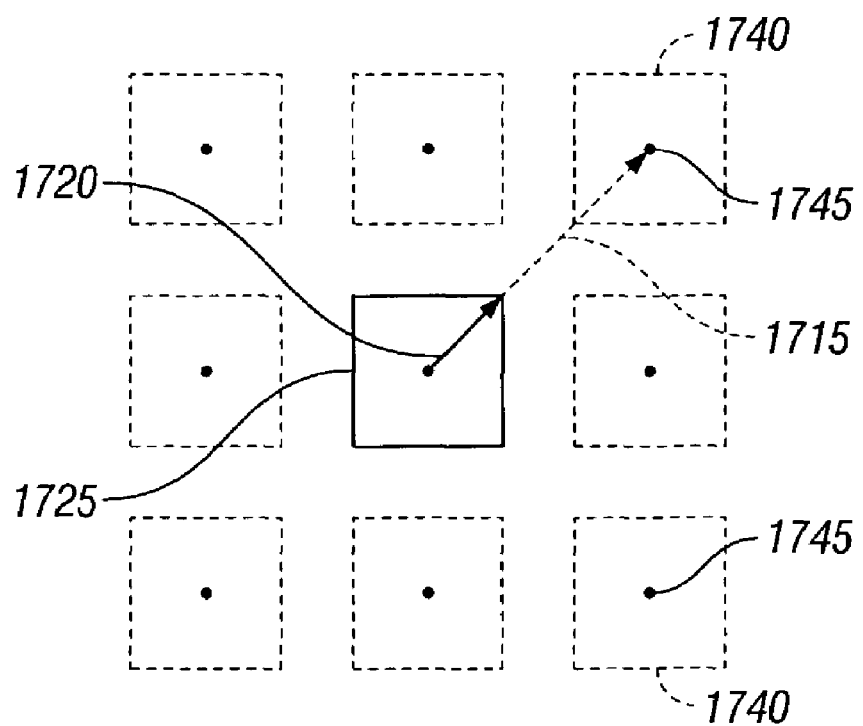

As shown in FIG. 17A, when the proportional movement is set to 200% and a new display 1730 is centered around the endpoint 1735 of the maximum potential document scrolling, the user has the capability to scroll a document area that is nine times the area of the display window 1705. Similarly, as shown in FIG. 17B, when the proportional movement is set to 300% and a new display 1740 is centered around the endpoint 1745 of the maximum potential document scrolling, the user has the capability to scroll a document area that is 16 times the area of the display window 1725. By contrast, when proportional movement is set to 100%, the user is able to scroll a document area that is four times the area of the display window. Thus, increasing proportional movement provides the user with the capability to scroll through several pages of the document with a single point-and-drag action. Alternatively, the user can make very fine position adjustments by setting a multiplier that is less than one.

An additional benefit is the enhancement in the perceived responsiveness and scroll speed capability of the application software. Since with the same action there is additional scrolling, the scrolling action appears to occur at a higher velocity. Stated more simply, the motion of the document is perceived to be zippy instead of sluggish. In another implementation, the user may set the multiplier based on the speed or acceleration of the pointing device. For example, a higher stylus velocity translates into a higher multiplier to generate the appropriate number of pixels to move the cursor. In yet another implementation, different multipliers may be used for horizontal and vertical movement.

Figure 18:
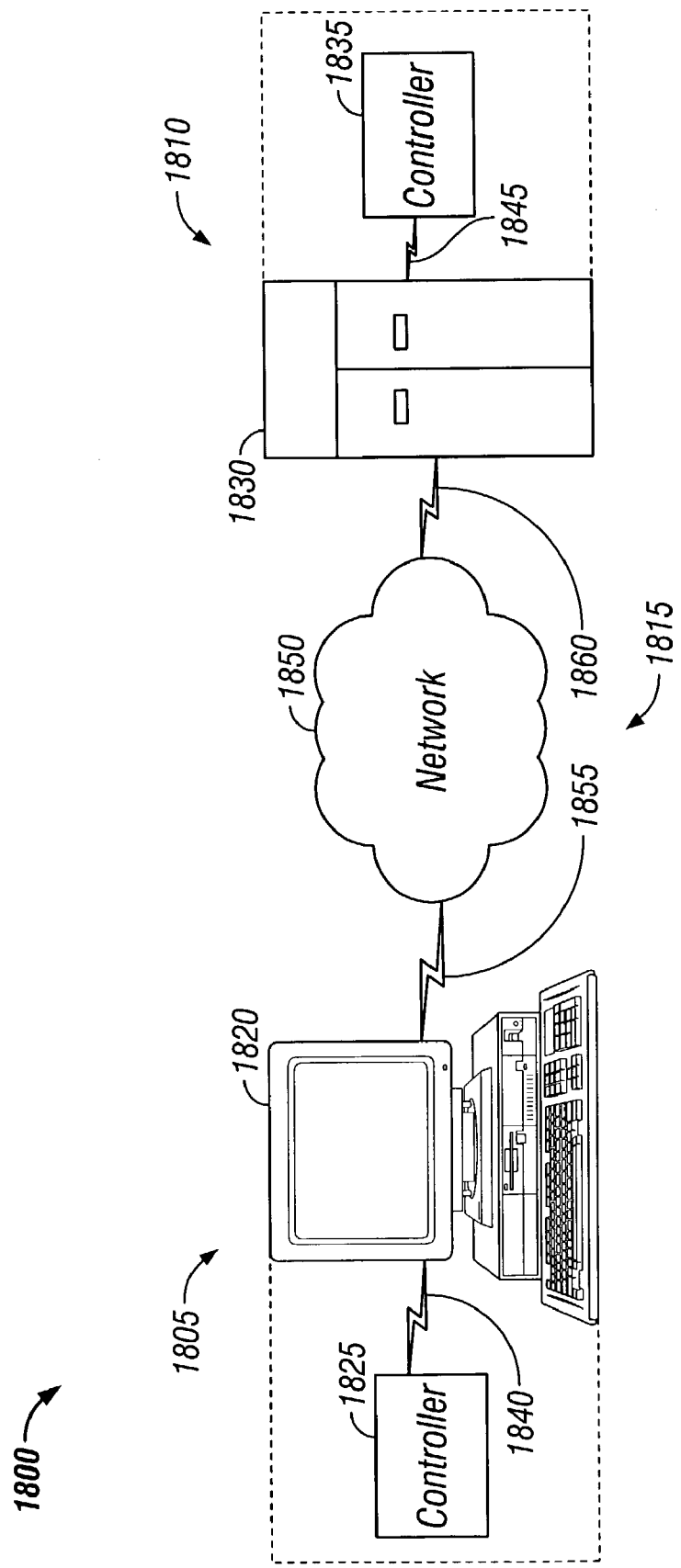
FIG. 18 is a block diagram of a computer and communications system.

For illustrative purposes, FIG. 18 describes a communications system for implementing a navigation aid to display information on an electronic device having limited display capability. For brevity, several elements in FIG. 18 are represented as monolithic entities. However, as would be understood by one skilled in the art, these elements each may include numerous interconnected computers and components designed to perform a set of specified operations and/or dedicated to a particular geographical region.

Referring to FIG. 18, a communications system 1800 is capable of delivering and exchanging data between a client system 1805 and a host system 1810 through a communications link 1815. The client system 1805 typically includes one or more client devices 1820 and/or client controllers 1825, and the host system 1810 typically includes one or more host devices 1830 and/or host controllers 1835. For example, the client system 1805 or the host system 1810 may include one or more general-purpose computers (e.g., personal computers), one or more special-purpose computers (e.g., devices specifically programmed to communicate with each other and/or the client system 1805 or the host system 1810), or a combination of one or more general-purpose computers and one or more special-purpose computers. The client system 1805 and the host system 1810 may be arranged to operate within or in concert with one or more other systems, such as, for example, one or more LANs ("Local Area Networks") and/or one or more WANs ("Wide Area Networks").

The client device 1820 (or the host device 1830) is generally capable of executing instructions under the command of a client controller 1825 (or a host controller 1835) and is capable of processing instructions or queries from the host system 1810. For example, the host system 1810 may query the client system 1805 as to the display size of the PDA device. The query may occur when the client 1805 and the host 1810 are connected or at periodic time intervals. The client device 1820 (or the host device 1830) is connected to the client controller 1825 (or the host controller 1835) by a wired or wireless data pathway 1840 or 1845 capable of delivering data.

Each of the client device 1820, the client controller 1825, the host device 1830, and the host controller 1835 typically includes one or more hardware components and/or software components. An example of a client device 1820 or a host device 1830 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. Often, the client device 1820 is implemented as a PDA or a mobile telephone.

An example of client controller 1825 or a host controller 1835 is a software application loaded on the client device 1820 or the host device 1830 for commanding and directing communications enabled by the client device 1820 or the host device 1830. Other examples include a program, a piece of code, an instruction, a device, a computer, a computer system, or a combination thereof, for independently or collectively instructing the client device 1820 or the host device 1830 to interact and operate as described. The client controller 1825 and the host controller 1835 may be embodied permanently or temporarily in any type of machine, component, physical or virtual equipment, storage medium, or propagated signal capable of providing instructions to the client device 1820 or the host device 1830.

The communications link 1815 typically includes a delivery network 1850 making a direct or indirect communication between the client system 1805 and the host system 1810, irrespective of physical separation. Examples of a delivery network 1850 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 1850 may include communication pathways 1855, 1860 that enable communications through the one or more delivery networks 1850 described above. Each of the communication pathways 1855, 1860 may include, for example, a wired, wireless, cable or satellite communication pathway.

The described processes and techniques may be performed by a browser running on the client system 1805 (e.g., a PDA). The processes and techniques also may be performed at a host or other remote device (e.g., a server) through which a web page is passed or from which a web page is received. The processes and techniques may be applied both to large displays and to small displays, to display windows that occupy varying portions of a display, and to full screen displays.

A number of implementations have been described. Nevertheless, it will be understood that various modifications may be made. Accordingly, other implementations are within the scope of the following claims.

What is claimed is:

1. A method for viewing an electronic document on a display, the method comprising:
    accessing an electronic document to be presented on a display, the electronic document including a header, a body, and a colophon, wherein the body includes multiple columns of electronic content;
    identifying a first column of electronic content included in the electronic document;
    identifying a second column of electronic content included in the electronic document;
    detecting a horizontal alignment, in the electronic document, between the first column of electronic content and the second column of electronic content;
    identifying a width of the first column of electronic content and a width of the second column of electronic content;
    identifying a width of a portion of the display in which at least one of the multiple columns is to be presented;
    comparing the width of the first column of electronic content to the width of the portion of the display;

comparing the width of the second column of electronic content to the width of the portion of the display;

determining, based on results of the comparisons, that the width of at least one of the first column of electronic content and the second column of electronic content exceeds the width of the portion of the display;

formatting, based on the determination, the first column of electronic content and the second column of electronic content for presentation in the portion of the display such that the width of each of the first column of electronic content and the second column of electronic content is equal to or less than the width of the portion of the display;

accessing data reflecting the detected horizontal alignment between the first column and the second column in the electronic document; and reformatting the electronic document for presentation in the portion of the display by aligning, in the reformatted document, the formatted first column of electronic content and the formatted second column of electronic content based on the detected horizontal alignment between the first column and the second column in the electronic document such that the horizontal alignment between the formatted first column and the formatted second column in the reformatted electronic document corresponds to the horizontal alignment between the first column and the second column in the electronic document.

2. The method of claim 1 further comprising identifying a format code of the electronic document.

3. The method of claim 2 wherein identifying the format code includes identifying a HTML format code.

4. The method of claim 3 wherein identifying the HTML format code includes identifying a body tag.

5. The method of claim 1 wherein the display is part of a client in a client/host architecture and identifying the width of the portion of the display further comprises notifying a host of the width of the portion of the display from information residing at the client.

6. The method of claim 5 further comprising establishing a connection between the client and the host.

7. The method of claim 6 wherein notifying the host includes notifying the host upon establishment of a connection between the client and the host.

8. The method of claim 6 wherein notifying the host includes updating the host with information residing at the client at time intervals after establishing the connection between the client and the host.

9. The method of claim 1 wherein the display is part of a client of a client/host architecture and reformatting the electronic document further includes requesting that the host reformat the electronic document in response to a command executed by the client.

10. The method of claim 1 wherein the electronic document is coded in HTML.

11. The method of claim 10 wherein reformatting further includes recoding the electronic document in a language other than HTML.

12. The method of claim 1 further comprising displaying the reformatted electronic document on the display of an electronic device.

13. The method of claim 12 wherein the electronic device is connected to the Internet.

14. The method of claim 12 wherein the electronic device comprises a personal digital assistant.

15. The method of claim 12 wherein the electronic device comprises a mobile phone.

16. The method of claim 12 wherein the electronic device comprises an Internet-enabled television set-top box.

17. The method of claim 12 wherein the electronic device comprises a portable computer.

18. The method of claim 1 wherein identifying the width of the first column of electronic content and the width of the second column of electronic content comprises identifying the width of the first column and the width of the second column based exclusively upon formatting information included in the electronic document.

19. The method of claim 1 further comprising:
identifying a body topology of the electronic document; and
identifying an arrangement of columns in the body of the electronic document based on the identified body topology.

20. The method of claim 19 wherein reformatting the electronic document comprises reformatting the electronic document based on the identified arrangement of columns such that the arrangement of the first and second columns in the reformatted electronic document corresponds to the arrangement of the first and second columns in the electronic document.

21. The method of claim 1 further comprising identifying a document topology of the electronic document, wherein the document topology includes header topology, body topology, and colophon topology.

22. The method of claim 21 wherein reformatting the electronic document comprises aligning the first and second columns in the reformatted electronic document to correspond with the document topology of the electronic document.

23. The method of claim 1 further comprising providing a navigation control that includes multiple column icons each corresponding to a column of information within the multiple columns of the reformatted electronic document such that actuating one of the multiple column icons horizontally scrolls and positions a display window on the column of information that corresponds to the actuated column icon.

24. The method of claim 1 further comprising:
identifying a number of the multiple columns and relative orientation between the first and second columns in the electronic document; and
configuring the reformatted electronic document to maintain the number of the multiple columns and relative orientation between the first and second columns to enable a user to horizontally scroll across the first and second columns of the reformatted electronic document that includes a web page.

25. The method of claim 1 further comprising enabling a user to use a scroll bar to horizontally scroll across the first and second columns of the reformatted electronic document.

26. The method of claim 1 further comprising providing a navigation control that includes a column icon representing at least one of the multiple columns of the reformatted electronic document such that activation of the column icon places a display window on one of the multiple columns.

27. The method of claim 26 wherein the column icon represents at least one of the multiple columns having a predetermined absolute position within the reformatted electronic document.

28. The method of claim 26 wherein the column icon represents at least one of the multiple columns having a relative position within the reformatted electronic document.

29. The method of claim 1 further comprising:
separating the first column of electronic content from the electronic document; and separating the second column of electronic content from the electronic document, wherein formatting, based on the determination, the first column of electronic content and the second column of electronic content electronic document for presentation in the portion of the display comprises formatting the separated first column and the separated second column, and reformatting the electronic document for presentation in the portion of the display by aligning, in the reformatted document, the formatted first column of electronic content and the formatted second column of electronic content comprises using the detected horizontal alignment between the first column and the second column in the electronic document reformatting to align the separated first column and separated second column to generate the reformatted electronic document.

30. The method of claim 1 wherein formatting, based on the determination, the first column of electronic content and the second column of electronic content for presentation in the portion of the display comprises maintaining an aggregate width of the first column of electronic content and the second column of electronic content greater than the width of the portion of the display.

31. The method of claim 1 wherein formatting, based on the determination, the first column of electronic content and the second column of electronic content for presentation in the portion of the display comprises formatting, based on the determination, the first column of electronic content and the second column of electronic content for presentation in the portion of the display such that an aggregate width of the first column of electronic content and the second column of electronic content is greater than the width of the portion of the display.

32. The method of claim 1 wherein determining, based on results of the comparisons, that the width of at least one of the first column of electronic content and the second column of electronic content exceeds the width of the portion of the display comprises:

determining that the width of the first column of electronic content exceeds the width of the portion of the display; and determining that the width of the second column of electronic content exceeds the width of the portion of the display.

33. The method of claim 1 wherein reformatting the electronic document comprises reformatting the electronic document such that a width of the reformatted electronic document exceeds the width of the portion of the display.

34. The method of claim 1, wherein:

identifying a first column of electronic content included in the electronic document comprises identifying a first column of electronic content included in a web page;

identifying a second column of electronic content included in the electronic document comprises identifying a second column of electronic content that is adjacent to the first column of electronic content in the web page;

detecting a horizontal alignment, in the electronic document, between the first column of electronic content and the second column of electronic content comprises detecting that the second column of electronic content is adjacent to the first column of electronic content in the web page;

identifying a width of the first column of electronic content and a width of the second column of electronic content comprises identifying a width of the first column of electronic content included in the web page and a width of the second column of electronic content that is adjacent to the first column of electronic content in the web page;

comparing the width of the first column of electronic content to the width of the portion of the display comprises comparing the width of the first column of electronic content included in the web page to the width of the portion of the display;

comparing the width of the second column of electronic content to the width of the portion of the display comprises comparing the width of the second column of electronic content that is adjacent to the first column of electronic content in the web page to the width of the portion of the display;

determining, based on results of the comparisons, that the width of at least one of the first column of electronic content and the second column of electronic content exceeds the width of the portion of the display comprises determining that the width of the first column of electronic content included in the web page and the width of the second column of electronic content that is adjacent to the first column of electronic content in the web page are both greater than the portion of the display;

formatting, based on the determination, the first column of electronic content and the second column of electronic content for presentation in the portion of the display such that the width of each of the first column of electronic content and the second column of electronic content is equal to or less than the width of the portion of the display comprises reducing the width of the first column of electronic content included in the web page and reducing the width of the second column of electronic content that is adjacent to the first column of electronic content in the web page;

accessing data reflecting the detected horizontal alignment between the first column and the second column in the electronic document comprises accessing data reflecting that the second column of electronic content is adjacent to the first column of electronic content in the web page; and reformatting the electronic document for presentation in the portion of the display by aligning, in the reformatted document, the formatted first column of electronic content and the formatted second column of electronic content based on the detected horizontal alignment between the first column and the second column in the electronic document such that the horizontal alignment between the formatted first column and the formatted second column in the reformatted electronic document corresponds to the horizontal alignment between the first column and the second column in the electronic document comprises arranging the reduced first column of electronic content adjacent to the reduced second column of electronic content in a reformatted version of the web page and maintaining a total width of the reformatted version of the web page greater than the width of the portion of the display.

35. A system for viewing an electronic document, the system comprising:

a display; and a processor connected to the display and programmed to:

access an electronic document to be presented on a display, the electronic document including a header, a body, and a colophon, wherein the body includes multiple columns of electronic content;

identify a first column of electronic content included in the electronic document;

identify a second column of electronic content included in the electronic document;

detect a horizontal alignment, in the electronic document, between the first column of electronic content and the second column of electronic content;

identify a width of the first column of electronic content and a width of the second column of electronic content;

identify a width of a portion of the display in which at least one of the multiple columns is to be presented;

compare the width of the first column of electronic content to the width of the portion of the display;

compare the width of the second column of electronic content to the width of the portion of the display;

determine, based on results of the comparisons that the width of at least one of the first column of electronic content and the second column of electronic content exceeds the width of the portion of the display;

format, based on the determination, the first column of electronic content and the second column of electronic content for presentation in the portion of the display such that the width of each of the first column of electronic content and the second column of electronic content is equal to or less than the width of the portion of the display;

access data reflecting the detected horizontal alignment between the first column and the second column in the electronic document;

reformat the electronic document for presentation in the portion of the display by aligning, in the reformatted document, the formatted first column of electronic content and the formatted second column of electronic content based on the detected horizontal alignment between the first column and the second column in the electronic document such that the horizontal alignment between the formatted first column and the formatted second column in the reformatted electronic document corresponds to the horizontal alignment between the first column and the second column in the electronic document; and display at least a portion of the reformatted electronic document in the portion of the display.

36. The system of claim 35 wherein the processor that is programmed to identify the width of the first column of electronic content and the width of the second column of electronic content includes a processor programmed to identify the width of the first column and the width of the second column based exclusively upon formatting information included in the electronic document.

37. The system of claim 35 wherein the processor is programmed to:
identify a body topology of the electronic document; and
identify an arrangement of columns in the body of the electronic document based on the identified body topology.

38. The system of claim 37 wherein the processor connected to the display and programmed to reformat the electronic document comprises a processor programmed to reformat the electronic document based on the identified arrangement of columns such that the arrangement of the first and second columns in the reformatted electronic document corresponds to the arrangement of the first and second columns in the electronic document.

39. The system of claim 36 wherein the processor is programmed to identify a document topology of the electronic document, wherein the document topology includes header topology, body topology, and colophon topology.

40. The system of claim 39 wherein the processor connected to the display and programmed to reformat the electronic document comprises a processor programmed to align the first and second columns in the reformatted electronic document to correspond with the document topology of the electronic document.

41. The system of claim 35 wherein the processor is further programmed to provide a navigation control that includes multiple column icons each corresponding to a column of information within the multiple columns of the reformatted electronic document such that actuating one of the multiple column icons horizontally scrolls and positions a display window on the column of information that corresponds to the actuated column icon.

42. The system of claim 35 wherein the processor is further programmed to:
identify a number of the multiple columns and relative orientation between the first and second columns in the electronic document; and
configure the reformatted electronic document to maintain the number of the multiple columns and relative orientation between the first and second columns to enable a user to horizontally scroll across the first and second columns of the reformatted electronic document that includes a web page.

43. The system of claim 35 wherein the processor is further programmed to enable a user to use a scroll bar to horizontally scroll across the first and second columns of the reformatted electronic document.

44. The system of claim 35 wherein the processor is further programmed to provide a navigation control that includes a column icon representing at least one of the multiple columns of the reformatted electronic document such that activation of the column icon places a display window on one of the multiple columns.

45. The system of claim 44 wherein the column icon represents at least one of the multiple columns having a predetermined absolute position within the reformatted electronic document.

46. The system of claim 44 wherein the column icon represents at least one of the multiple columns having a relative position within the reformatted electronic document.

47. The system of claim 35 wherein the processor is programmed to format, based on the determination, the first column of electronic content and the second column of electronic content for presentation in the portion of the display by maintaining an aggregate width of the first column of electronic content and the second column of electronic content greater than the width of the portion of the display.

48. The system of claim 35 wherein the processor is programmed to format, based on the determination, the first column of electronic content and the second column of electronic content for presentation in the portion of the display by formatting, based on the determination, the first column of electronic content and the second column of electronic content for presentation in the portion of the display such that an aggregate width of the first column of electronic content and the second column of electronic content is greater than the width of the portion of the display.

49. The system of claim 35 wherein the processor is programmed to determine, based on results of the comparisons, that the width of at least one of the first column of electronic content and the second column of electronic content exceeds the width of the portion of the display by:
determining that the width of the first column of electronic content exceeds the width of the portion of the display; and determining that the width of the second column of electronic content exceeds the width of the portion of the display.

50. The system of claim 35 wherein the processor is programmed to reformat the electronic document by reformatting the electronic document such that a width of the reformatted electronic document exceeds the width of the portion of the display.

51. The system of claim 35, wherein the processor is programmed to:
   identify a first column of electronic content included in the electronic document by identifying a first column of electronic content included in a web page;
   identify a second column of electronic content included in the electronic document by identifying a second column of electronic content that is adjacent to the first column of electronic content in the web page;
   detect a horizontal alignment, in the electronic document, between the first column of electronic content and the second column of electronic content by detecting that the second column of electronic content is adjacent to the first column of electronic content in the web page;
   identify a width of the first column of electronic content and a width of the second column of electronic content by identifying a width of the first column of electronic content included in the web page and a width of the second column of electronic content that is adjacent to the first column of electronic content in the web page;
   compare the width of the first column of electronic content and to the width of the portion of the display by comparing the width of the first column of electronic content included in the web page to the width of the portion of the display;
   compare the width of the second column of electronic content to the width of the portion of the display by comparing the width of the second column of electronic content that is adjacent to the first column of electronic content in the web page to the width of the portion of the display;
   determine, based on results of the comparisons, that the width of at least one of the first column of electronic content and the second column of electronic content exceeds the width of the portion of the display by determining that the width of the first column of electronic content included in the web page and the width of the second column of electronic content that is adjacent to the first column of electronic content in the web page are both greater than the portion of the display;
   format, based on the determination, the first column of electronic content and the second column of electronic content for presentation in the portion of the display such that the width of each of the first column of electronic content and the second column of electronic content is equal to or less than the width of the portion of the display by reducing the width of the first column of electronic content included in the web page and reducing the width of the second column of electronic content that is adjacent to the first column of electronic content in the web page;
   access data reflecting the detected horizontal alignment between the first column and the second column in the electronic document by accessing data reflecting that the second column of electronic content is adjacent to the first column of electronic content in the web page; and
   reformat the electronic document for presentation in the portion of the display by aligning, in the reformatted document, the formatted first column of electronic content and the formatted second column of electronic content based on the detected horizontal alignment between the first column and the second column in the electronic document such that the horizontal alignment between the formatted first column and the formatted second column in the reformatted electronic document corresponds to the horizontal alignment between the first column and the second column in the electronic document by arranging the reduced first column of electronic content adjacent to the reduced second column of electronic content in a reformatted version of the web page and maintaining a total width of the reformatted version of the web page greater than the width of the portion of the display.

52. A method for viewing an electronic document on a display, the method comprising:
   accessing an electronic document to be presented on a display;
   identifying a width of a portion of the display in which the electronic document is to be presented;
   identifying a first component of the electronic document;
   identifying a second component of the electronic document, the second component of the electronic document being different than the first component of the electronic document and a width of the second component of the electronic document being greater than the width of the portion of the display;
   identifying a width of the first component of the electronic document;
   comparing the width of the first component of the electronic document to the width of the portion of the display;
   determining, based on results of the comparison, that the width of first component of the electronic document exceeds the width of the portion of the display;
   formatting, based on the determination, the first component of the electronic document for presentation in the portion of the display such that the width of the first component of the electronic document is equal to or less than the width of the portion of the display; and
   reformatting the electronic document for presentation in the portion of the display to include the formatted first component of the electronic document and the second component of the electronic document such that the width of the formatted first component of the electronic document is equal to or less than the width of the portion of the display and the width of the second component of the electronic document is greater than the width of the portion of the display,
   wherein identifying a first component of the electronic document comprises identifying a column of electronic content included in a body of the electronic document;
   wherein identifying a second component of the electronic document comprises identifying a header of the electronic document; and
   wherein reformatting the electronic document for presentation in the portion of the display comprises reformatting the electronic document for presentation in the portion of the display to include the column of electronic content included in the body of the electronic document and the header of the electronic document such that the width of the column of electronic content included in the body of the electronic document is equal to or less than the width of the portion of the display and the width of the header of the electronic document is greater than the width of the portion of the display.

53. The method of claim 52 wherein the column of electronic content included in the body of the electronic document is a first column of electronic content included in the body of the electronic document further comprising:

identifying a second column of electronic content included in the body of the electronic document;

identifying a colophon of the electronic document, a width of the colophon of the electronic document being greater than the width of the portion of the display;

identifying a width of the second column of electronic content included in the body of the electronic document;

comparing the width of the second column of electronic content included in the body of the electronic document to the width of the portion of the display;

determining, based on results of the comparison, that the width of second column of electronic content included in the body of the electronic document exceeds the width of the portion of the display; and formatting, based on the determination, the second column of electronic content included in the body of the electronic document for presentation in the portion of the display such that the width of the second column of electronic content included in the body of the electronic document is equal to or less than the width of the portion of the display, wherein reformatting the electronic document for presentation in the portion of the display comprises reformatting the electronic document for presentation in the portion of the display to include the first column of electronic content included in the body of the electronic document, the second column of electronic content included in the body of the electronic document, the header of the electronic document, and the colophon of the electronic document such that the width of the first column of electronic content included in the body of the electronic document and the width of the second column of electronic content included in the body of the electronic document are each equal to or less than the width of the portion of the display and the width of the header of the electronic document and the width of the colophon of the electronic document are each greater than the width of the portion of the display.

54. The method of claim 53 wherein reformatting the electronic document for presentation in the portion of the display comprises:

maintaining a relative vertical arrangement between the header of the electronic document, the first column of electronic content included in the body of the electronic document, the second column of electronic content included in the body of the electronic document, and colophon of the electronic document; and maintaining a relative horizontal alignment between the first column of electronic content included in the body of the electronic document and the second column of electronic content included in the body of the electronic document.

55. A method for viewing an electronic document on a display, the method comprising:

accessing an electronic document to be presented on a display;

identifying a width of a portion of the display in which the electronic document is to be presented;

identifying a first portion of the electronic document that includes logical columns;

determining that the first portion of the electronic document includes logical columns;

in response to determining that the first portion of the electronic document includes logical columns:

identifying a width of each of the logical columns included in the first portion of the electronic document, comparing the identified width of each of the logical columns included in the first portion of the electronic document to the width of the portion of the display, determining, based on results of the comparison, that the width of at least one of the logical columns included in the first portion of the electronic document exceeds the width of the portion of the display, and formatting, based on the determination that the width of at least one of the logical columns included in the first portion of the electronic document exceeds the width of the portion of the display, the first portion of the electronic document such that a width of each of the columns included in the first portion of the electronic document is equal to or less than the width of the portion of the display;

identifying a second portion of the electronic document that does not include logical columns, the second portion of the electronic document being different than the first portion of the electronic document and a width of the second portion of the electronic document being greater than the width of the portion of the display;

determining that the second portion of the electronic document does not include logical columns;

in response to determining that the second portion of the electronic document does not include logical columns, maintaining a width of the second portion of the electronic document such that the width of the second portion of the electronic document is greater than the width of the portion of the display; and reformatting the electronic document for presentation in the portion of the display to include the formatted first portion of the electronic document and the second portion of the electronic document such that the width of each of the columns included in the formatted first portion of the electronic document is equal to or less than the width of the portion of the display and the width of the second portion of the electronic document is greater than the width of the portion of the display.

56. The method of claim 55 further comprising:

formatting the second portion of the electronic document in a manner that maintains the width of the second portion of the electronic document greater than the width of the portion of the display, wherein reformatting the electronic document for presentation in the portion of the display comprises reformatting the electronic document for presentation in the portion of the display to include the formatted first portion of the electronic document and the formatted second portion of the electronic document.

57. The method of claim 56 wherein:

formatting the second portion of the electronic document comprises reducing the width of the second portion of the electronic document such that the width of the formatted second portion of the electronic document is less than the width of the second portion prior to formatting and greater than the width of the portion of the display.

58. A system for viewing an electronic document on a display, the system comprising:

a display; and a processor connected to the display and programmed to:

access an electronic document to be presented on a display;

identify a width of a portion of the display in which the electronic document is to be presented;
identify a first component of the electronic document;
identify a second component of the electronic document, the second component of the electronic document being different than the first component of the electronic document and a width of the second component of the electronic document being greater than the width of the portion of the display;
identify a width of the first component of the electronic document;
compare the width of the first component of the electronic document to the width of the portion of the display;
determine, based on results of the comparison, that the width of first component of the electronic document exceeds the width of the portion of the display;
format, based on the determination, the first component of the electronic document for presentation in the portion of the display such that the width of the first component of the electronic document is equal to or less than the width of the portion of the display; and
reformat the electronic document for presentation in the portion of the display to include the formatted first component of the electronic document and the second component of the electronic document such that the width of the formatted first component of the electronic document is equal to or less than the width of the portion of the display and the width of the second component of the electronic document is greater than the width of the portion of the display,
wherein the processor is programmed to identify a first component of the electronic document by identifying a column of electronic content included in a body of the electronic document;
wherein the processor is programmed to identify a second component of the electronic document by identifying a header of the electronic document; and
wherein the processor is programmed to reformat the electronic document for presentation in the portion of the display by reformatting the electronic document for presentation in the portion of the display to include the column of electronic content included in the body of the electronic document and the header of the electronic document such that the width of the column of electronic content included in the body of the electronic document is equal to or less than the width of the portion of the display and the width of the header of the electronic document is greater than the width of the portion of the display.

59. The system of claim 58 wherein the column of electronic content included in the body of the electronic document is a first column of electronic content included in the body of the electronic document wherein the processor is further programmed to:
identify a second column of electronic content included in the body of the electronic document;
identify a colophon of the electronic document, a width of the colophon of the electronic document being greater than the width of the portion of the display;
identify a width of the second column of electronic content included in the body of the electronic document;
compare the width of the second column of electronic content included in the body of the electronic document to the width of the portion of the display;
determine, based on results of the comparison, that the width of second column of electronic content included in the body of the electronic document exceeds the width of the portion of the display; and
format, based on the determination, the second column of electronic content included in the body of the electronic document for presentation in the portion of the display such that the width of the second column of electronic content included in the body of the electronic document is equal to or less than the width of the portion of the display,
wherein the processor is programmed to reformat the electronic document for presentation in the portion of the display by reformatting the electronic document for presentation in the portion of the display to include the first column of electronic content included in the body of the electronic document, the second column of electronic content included in the body of the electronic document, the header of the electronic document, and the colophon of the electronic document such that the width of the first column of electronic content included in the body of the electronic document and the width of the second column of electronic content included in the body of the electronic document are each equal to or less than the width of the portion of the display and the width of the header of the electronic document and the width of the colophon of the electronic document are each greater than the width of the portion of the display.

60. The system of claim 59 wherein the processor is programmed to reformat the electronic document for presentation in the portion of the display by:
maintaining a relative vertical arrangement between the header of the electronic document, the first column of electronic content included in the body of the electronic document, the second column of electronic content included in the body of the electronic document, and colophon of the electronic document; and
maintaining a relative horizontal alignment between the first column of electronic content included in the body of the electronic document and the second column of electronic content included in the body of the electronic document.

61. A system for viewing an electronic document on a display, the system comprising:
a display; and
a processor connected to the display and programmed to:
accessing an electronic document to be presented on a display;
identifying a width of a portion of the display in which the electronic document is to be presented;
identifying a first portion of the electronic document that includes logical columns;
determining that the first portion of the electronic document includes logical columns;
in response to determining that the first portion of the electronic document includes logical columns:
identifying a width of each of the logical columns included in the first portion of the electronic document,
comparing the identified width of each of the logical columns included in the first portion of the electronic document to the width of the portion of the display,
determining, based on results of the comparison, that the width of at least one of the logical columns included in the first portion of the electronic document exceeds the width of the portion of the display, and
formatting, based on the determination that the width of at least one of the logical columns included in the first portion of the electronic document exceeds the width of the portion of the display, the first portion of the electronic document such that a width of each of the columns included in the first portion of the electronic document is equal to or less than the width of the portion of the display;

identifying a second portion of the electronic document that does not include logical columns, the second portion of the electronic document being different than the first portion of the electronic document and a width of the second portion of the electronic document being greater than the width of the portion of the display;

determining that the second portion of the electronic document does not include logical columns;

in response to determining that the second portion of the electronic document does not include logical columns, maintaining a width of the second portion of the electronic document such that the width of the second portion of the electronic document is greater than the width of the portion of the display; and reformatting the electronic document for presentation in the portion of the display to include the formatted first portion of the electronic document and the second portion of the electronic document such that the width of each of the columns included in the formatted first portion of the electronic document is equal to or less than the width of the portion of the display and the width of the second portion of the electronic document is greater than the width of the portion of the display.

62. The system of claim 61:

wherein the processor is further programmed to format the second portion of the electronic document in a manner that maintains the width of the second portion of the electronic document greater than the width of the portion of the display, wherein the processor is programmed to reformat the electronic document for presentation in the portion of the display by reformatting the electronic document for presentation in the portion of the display to include the formatted first portion of the electronic document and the formatted second portion of the electronic document.

63. The system of claim 62 wherein the processor is programmed to format the second portion of the electronic document by reducing the width of the second portion of the electronic document such that the width of the formatted second portion of the electronic document is less than the width of the second portion prior to formatting and greater than the width of the portion of the display.

* * * * *